United States Patent [19]
Anderson et al.

[11] Patent Number: 5,981,739
[45] Date of Patent: Nov. 9, 1999

[54] POLYANHYDRIDE CROSSLINKED FIBROUS CELLULOSIC PRODUCTS AND PROCESS FOR THEIR PREPARATION

[75] Inventors: Ronald L. Anderson, Naperville; Wendell W. Cattron, Hinckley; Vincent F. Smith, Jr., Big Rock; David J. Fenoglio, Wheaton, all of Ill.

[73] Assignee: BP Amoco Corporation, Chicago, Ill.

[21] Appl. No.: 08/926,911

[22] Filed: Sep. 10, 1997

Related U.S. Application Data

[63] Continuation-in-part of application No. 08/721,593, Sep. 26, 1996, abandoned.

[51] Int. Cl.$^6$ ............................. C08B 15/10; C08B 3/00; C07C 63/307
[52] U.S. Cl. ............................. 536/80; 536/63; 562/405; 562/480; 562/483
[58] Field of Search .................................. 536/56, 58, 63, 536/69, 76, 80; 562/405, 480, 483

[56] References Cited

U.S. PATENT DOCUMENTS

| | | | |
|---|---|---|---|
| 3,183,248 | 5/1965 | Hirsch et al. | 260/346.3 |
| 3,277,117 | 10/1966 | Van Strien et al. | 260/346.3 |
| 3,632,608 | 1/1972 | Holub et al. | 260/346.3 |
| 3,745,011 | 7/1973 | Hudgin | 96/88 |
| 3,931,422 | 1/1976 | Bateman et al. | 427/424 |
| 3,960,483 | 6/1976 | Payet | 8/116.4 |
| 4,006,112 | 2/1977 | Bateman et al. | 260/9 |
| 4,065,349 | 12/1977 | Bateman et al. | 162/158 |
| 4,208,488 | 6/1980 | Kraft et al. | 525/107 |
| 4,595,628 | 6/1986 | Kelly et al. | 428/265 |
| 4,820,307 | 4/1989 | Welch et al. | 8/120 |
| 4,936,865 | 6/1990 | Welch et al. | 8/120 |
| 4,975,209 | 12/1990 | Welch et al. | 252/8.6 |
| 5,137,537 | 8/1992 | Herron et al. | 8/120 |
| 5,183,707 | 2/1993 | Herron et al. | 428/364 |
| 5,190,563 | 3/1993 | Herron et al. | 8/120 |
| 5,221,285 | 6/1993 | Andrews et al. | 8/127.1 |
| 5,225,047 | 7/1993 | Graef et al. | 162/9 |
| 5,427,587 | 6/1995 | Arkens et al. | 8/116.1 |

FOREIGN PATENT DOCUMENTS

| | | |
|---|---|---|
| 0427317 | 5/1991 | European Pat. Off. . |
| 2754175 | 6/1978 | Germany . |
| 2707018 | 8/1978 | Germany . |
| 59216983 | 12/1942 | Japan . |
| 51-054528 | 5/1976 | Japan . |
| 53-082743 | 7/1978 | Japan . |
| 57-193351 | 11/1982 | Japan . |
| 88286391 | 5/1990 | Japan . |
| 02844 | 1/1997 | WIPO . |

*Primary Examiner*—Howard C. Lee
*Attorney, Agent, or Firm*—Mary Jo Kanady; Wallace L. Oliver

[57] ABSTRACT

A process for preparation of crosslinked cellulosic products containing at least 30 wt. % cellulosic fibers and the polyanhydride crosslinked cellulosic products resulting therefrom wherein a cellulosic material is treated with an aqueous solution of a polycarboxylic acid formed by hydrolysis of a polyanhydride of the structure

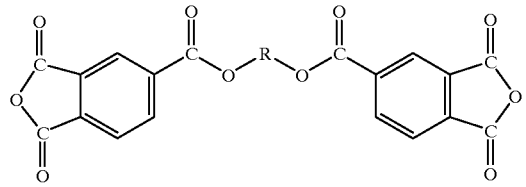

which comprises the reaction product of trimellitic anhydride and a diol in the mole ratio of from about 2.0:0.9 to about 2.0:1.1, wherein R is selected from the group consisting of alkyl, alkylene and cycloalkylene moieties of up to 12 carbon atoms and ethylene oxide and propylene oxide moieties of molecular weight up to about 6000, wherein said cellulosic material is impregnated with an aqueous solution of said polyanhydride, dried, and heated to a temperature of from about 120° C. to about 200° C. at ambient pressure to obtain crosslinking of the cellulose fibers with the said polyanhydride by an ester bond between the hydroxyl groups of the cellulosic fibers and the anhydride groups of the anhydride. Fibrous cellulosic products are readily repulped paper with improved wet strength, pulp fluff with improved wet resilience, wood oriented strand board with improved moisture resistance, and textile products with improved durable press and reduced shrink characteristics.

36 Claims, No Drawings

5,981,739

POLYANHYDRIDE CROSSLINKED FIBROUS CELLULOSIC PRODUCTS AND PROCESS FOR THEIR PREPARATION

This application is a continuation-in-part of application Ser. No. 08/721,593 filed Sep. 26, 1996, now abandoned, the specification and claims of which are incorporated by reference herein.

FIELD OF THE INVENTION

This invention relates to a process for preparing alkyl glycol bis(anhydrotrimellitate) polyanhydride or polycarboxylic acid crosslinked fibrous cellulosic products containing at least 30 wt. % cellulosic fibers and to the polyanhydride crosslinked fibrous cellulosic products resulting therefrom. This invention is especially directed to a process for preparation of fibrous cellulosic products such as a readily repulpable paper with improved wet strength, pulp fluff with improved wet resilience, wood oriented strand board which exhibits less swelling when exposed to water, and textile fabric with improved durable press and reduced shrink characteristics. The present invention also relates to ethylene glycol bis-(anhydrotrimellitate) (EGBAT) resin composition and hydrated ethylene glycol bis-(anhydrotrimellitate) resin composition and aqueous solutions thereof.

BACKGROUND OF THE INVENTION

Crosslinked cellulose products are widely known in the art. It is well-known that properties of cellulosic materials can be improved as to wet strength and other properties by crosslinking the cellulose fibers with intrafiber chemical crosslink bonds so that chemical bonds exist between the hydroxyls of the cellulose, thereby replacing weak hydrogen bonds with strong covalent bonds to tie together hydroxyl groups. For example, monomeric amine resins such as methylolated derivatives of urea or melamine react with hydroxyls of the cellulose to replace weak hydrogen bonds with strong covalent bonds. However, such crosslinking agents, known in the art as formaldehyde and formaldehyde addition products, have been known to cause problems. When formaldehyde is used as the sole crosslinking agent, as indicated in U.S. Pat. No. 3,960,483, the process for treating cellulosic fiber containing products such as cloth made of cotton has tended to lack reproducibility because control of the formaldehyde crosslinking reaction has been difficult. Additionally, as indicated in EP Publication 0 427 317 A2, Herron, et al., the commercial appeal of crosslinked fibers with formaldehyde and formaldehyde addition products has suffered due to safety concerns. These crosslinking agents are said to cause irritation to the human skin and have been associated with other human safety concerns such as the irritating effect of formaldehyde vapor on the eyes.

Crosslinked cellulosic bonding agents serve to give both chemical and physical bonding between adjacent fibers. The crosslinked fibers are normally stiffer than their untreated counterparts. As taught in U.S. Pat. No. 5,225,047, the crosslinking can result in considerable fiber embrittlement. A refiberization of a sheeted crosslinked product at point of use can result in an excessive amount of fines in the preparation of fluff products with greater bulk which tend to hold retained liquid under compressive forces encountered during use of the product such as a diaper. U.S. Pat. No. 5,225,047 also teaches use of a debonding agent with a latent cellulose crosslinking agent wherein the crosslinking agent is a polycarboxylic acid or methylolated urea compound to prepare a cellulose product which can be repulped in water without significant fiber breakage.

A particular advantage of this invention is found in the lack of any need to include a debonding agent to depulp the crosslinked cellulosic product.

Methods of improving a cellulosic product by crosslinking, as indicated in U.S. Pat. No. 5,225,047, have used polycarboxylic acids in aqueous compositions as crosslinking agents to obtain a formaldehyde-free cellulose strengthening aqueous composition. Examples of such use of polycarboxylic acids are taught in U.S. Pat. No. 5,427,587. The polyacid must be sufficiently nonvolatile so that it will substantially remain in the treated substrate during heating and curing operations and bear at least two carboxylic acid groups. Suitable examples are citric acid, butane tetracarboxylic acid (BTCA) and cyclobutane tetracarboxylic acid or a polymeric polyacid such as polymethacrylic acid.

However, as noted above in U.S. Pat. No. 5,225,047, use of a crosslinking agent such as a polyacid can result in embrittlement of the cellulosic fibers.

The present invention is applicable to fibrous cellulosic material in the form of textile fibers and woven and non-woven textiles such as yarns and woven or knit fabrics, fibers, linters, roving, slivers, paper, pulp fluff, and wood oriented strand board termed consolidated wood products, the fibrous cellulosic material characterized as containing at least 30 wt. % cellulosic fibers.

The integrity of fibrous cellulosic materials, as noted above, is dependent on the hydrogen bonds which form between the structures of the cellulose fibers. The bonds between hydroxyls of neighboring fibers are very strong in a dry state but the hydrophilic nature of the cellulose and the bonding of water with the cellulose can affect the hydrogen bonds formed between the structures of the cellulose fibers. Fibrous cellulosic materials lose much of their strength when wet.

Improvement in the wet strength of fibrous cellulosic materials by reaction with the hydroxyl groups of the cellulose improves the range of utility of fibrous cellulosic materials. Woven and non-woven textiles are useful in personal hygiene products such as diapers and incontinent products which utilize the absorbency and comfort of fibrous cellulosic materials. Improvement in wet strength of absorbent cellulosic materials improves fluid retention of diapers and incontinent products. Improvement in wet strength of paper helps preserve its stiffness, bursting, tensile and tearing strength when paper is exposed to high humidity or it is wet. Wood oriented strand board, also called consolidated wood products, can exhibit swelling when exposed to water and, in part, can disintegrate under extreme conditions of heat and water exposure.

Construction of incontinent products and diapers is illustrative of applications of improved wet strength fibrous cellulosic materials. Incontinent products and disposable diapers are constructed in layers to maximize comfort and performance. Typical construction, starting at the skin side of the article, consists of a topsheet made from hydrophobic polypropylene fiber, a wicking layer made from cellulosic pulp, an absorbent core consisting of super absorbent polymer particles imbedded in cellulosic pulp, and the backsheet, usually made from polyethylene. The absorbent fiber most commonly used in incontinent products and diapers is cellulosic fiber such as comminuted wood pulp, commonly known as "pulp fluff", or simply "fluff". This invention has utility in crosslinking the pulp fluff used in the wicking layer, which requires good wettability, and proper pore size and pore size distribution. Polycarboxylic acids such as citric acid have been used to crosslink pulp fiber. This invention teaches a more effective crosslinking technology for cellulosic pulp. This modifies the characteristics of the fibrous web. The polyanhydride crosslinking imparts a three-dimensional character to each fiber. This gives the assembly more bulk or lower density with resulting greater fluid distribution and absorption capacity.

The polycarboxylic reaction products of TMA and a diol of the present invention, including, but not limited to hydrolyzed EGBAT resin may also be used to prepare individualized crosslinked fibers. Process for making individualized crosslinked fibers and structures incorporating such fibers are described in U.S. Pat. No. 5,137,537; U.S. Pat. No. 5,190,563; and U.S. Pat. No. 5,183,707 each of which is incorporated herein by reference in its entirety.

Superabsorbent polymer (SAP), in powder or fiber form, can also be incorporated into the absorbent cellulose product. SAP comprises polymers which can form gels containing at least 10 grams of water per gram of polymer. Certain applications require the fiber to be reinforced with long fibers which increase the tear strength. Such long fibers include, but are not limited to, viscose fibers and polyester fibers. The use of such long fibers enables one to form webs which are sufficiently strong to be used in processes in which webs of special density can be cut to size and placed at the desired site in absorbent products. Increased strength is also desirable for products having low grammages in order to ensure that the absorption body does not rupture in the final product.

Products according to the invention having density gradients can be produced by forming and pressing such webs to obtain webs of different densities before being laid together or by pulp having different compressibilities, produced by varying the crosslinking composition with which the cellulose fibers are impregnated. The number of layers used and the densities of the layers will depend on the use of the product. For products, such as diapers and incontinent pads, which are to be loaded with large amounts of liquid over a short time period, it may be desirable to have a first upper layer of low density which faces the wearer of the absorbent product and one or more additional layers beneath and, if desired, connected to the first layer which may be compressed to higher densities. For example, a diaper, may be packed at an average density of about 130 to about 170 kg/m³. Use of the cellulose pulp of the present invention which has been impregnated with hydrated EGBAT resin provides the possibility of increasing the average density of the absorption body in absorbent products and thus lowering the costs of storing and transporting such products.

The impregnated pulp of the present invention can also be formed into fiber webs of high density using a dry or a wet forming technique, with the fiber being dispersed in air or water as the web is formed on a wire. The webs can be reeled into high density reels which may provide a considerable cost savings in transportation and storing the impregnated pulp as a semi-finished product. The fiber web can later be fibered, for example in a hammer mill, and then formed into products of the desired density or the fiber web can be cut to a desired size for placing in the desired position in an absorbent product such as a diaper, incontinence pad, sanitary napkin, etc. An advantage of the present invention is that pulp containing the impregnated cellulose fibers of the invention which are crosslinked in the dry state can be used in current equipment for producing diapers, incontinence pads, sanitary napkins, and air-formed paper.

It is an object of this invention to provide fibrous cellulosic materials containing at least 30 wt. % cellulosic fibers with improved wet strength by the preparation of an impregnated cellulosic material containing ester bonds between the hydroxyl groups of the cellulose and the anhydride groups of a polyanhydride It is an object of this invention to provide a crosslinked cellulosic product which can be readily repulped in water to a free fiber condition without excessive fiber breakage or energy input.

It is a further object of this invention to provide a cellulosic product such as paper with improved wet strength, but which is readily repulpable.

It is a further object of this invention to provide a cellulosic product such as pulp fluff with improved wet resilience.

It is a further object of this invention to provide a cellulosic product such as textile fabric with improved durable press characteristics.

It is a further object of this invention to provide wood products such as oriented strand board, also called consolidated wood products, which exhibit less swelling when exposed to water.

It is a further object of this invention to provide an ethylene glycol bis-(anhydrotrimellitate) resin composition and a hydrated ethylene glycol bis-(anhydrotrimellitate) resin composition and aqueous solutions thereof. Such compositions and aqueous solutions are useful in crosslinking cellulose fibers.

SUMMARY OF THE INVENTION

This invention relates to impregnated cellulosic material containing an ester bond between the hydroxyl groups of the cellulosic fibers and anhydride groups of a polyanhydride and to a process for the preparation of crosslinked fibrous cellulosic products wherein a cellulosic fibrous substrate containing at least 30 wt. % cellulosic fibers is treated with an aqueous solution of an alkyl glycol bis (anhydrotrimellitate), either as a polyacid or polyanhydride of the structure, as the anhydride,

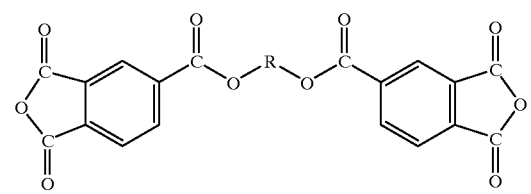

which comprises the reaction product of trimellitic anhydride and a diol in the mole ratio of from about 2.0:0.6 to about 2.0:1.5, preferably from about 2.0:0.9 to about 2.0:1.1, wherein R is selected from the group consisting of alkyl, alkylene and cycloalkylene moieties of up to 30 carbon atoms and ethylene oxide moieties of molecular weight up to about 6000, and propylene oxide moieties of molecular weight up to about 6000. The cellulosic substrate is a fibrous cellulosic material characterized as containing at least 30 wt. % cellulosic fibers including paper, pulp fluff, wood oriented strandboard products, strawboard, and textile fabric. The process improves wet strength of paper but the paper is readily repulpable, improves wet resilience of pulp fluff, reduces wet swelling of wood products, and improves the durable press and shrink characteristics of textile fabric containing at least 30 wt. % cellulosic fibers.

The present invention also relates to the hydrolyzed reaction product of trimellitic anhydride and at least one diol in the mole ratios of from about 2.0:0.6 to about 2.0:1.5, preferably from about 2.0:0.9 to about 2.0:1.1 and to a process for crosslinking cellulose fibers using such reaction product. The diol is preferably selected from one or more of ethylene glycol; propylene glycol; 1,3-propanediol; 2-methyl-1,3-propanediol; diethylene glycol; and neopentyl glycol. A particularly preferred diol is ethylene glycol.

The present invention further relates to an aqueous solution comprising water and up to about 70 weight percent, preferably about 0.5 wt % to about 65 wt %, more preferably about 6 wt % to about 60 wt. %, still more preferably about 40 to about 60 weight percent, and most preferably about 45 wt % to about 55 wt % of the hydrolyzed reaction product of trimellitic anhydride and at least one diol in the mole ratios of from about 2.0:0.6 to about 2.0:1.5, preferably from about 2.0:0.9 to about 2.0:1.1 and to a process for crosslinking cellulose fibers using such aqueous solution. The diol is preferably selected from one or more of ethylene glycol, propylene glycol, and 1,3-propanediol. A particularly preferred diol is ethylene glycol.

The present invention additionally relates to water-soluble polymers, especially oligomers, which have been produced by reacting trimellitic anhydride with at least one diol, preferably ethylene glycol, so that the oligomers obtained have free acid groups and to the use of such oligomers to crosslink cellulose fibers by reacting the cellulose with an effective crosslinking quantity of one or more water-soluble oligomers having an average molecular weight, Mw, of between about 400 and about 1000 g/mol, preferably between about 440 and 920 g/mol and free acid groups.

The present invention also relates to a crosslinking composition comprising a mixture of water-soluble polymers/oligomers which have been produced by reacting trimellitic anhydride (TMA) with at least one diol, preferably ethylene glycol followed by hydrolysis, so that the oligomers obtained have free acid groups. The crosslinking composition comprises a mixture of water-soluble polymers, especially oligomers, which comprise reaction products of the type $T_{n+1}D_n$, wherein T is that part of the oligomer molecule which is derived from TMA and D is that part of the oligomer molecule which is derived from a diol and wherein n is an integer of from about 1 to about 20, preferably about 1 to about 12. The crosslinking mixture may also contain oligomers of the formula $T_mD_m$ wherein T and D are defined as above and wherein m is at least 4, especially $T_4D_4$.

The polymers/oligomers have functional groups, such as carboxyl, which can react with the hydroxyl groups of the cellulose on heating, and, if desired, in the presence of a catalyst. A preferred reaction product is the reaction product of TMA and ethylene glycol. Most of the oligomers derived from the reaction of TMA and ethylene glycol can be represented by the formula $T_{n+1}E_n$ where T is a trimellitate moiety and E is an ethylene glycol moiety and wherein n is an integer of from about 1 to about 20, preferably about 1 to about 12. The reaction product may also contain oligomers of the formula $T_mE_m$ wherein T and E are defined as above and m is at least 4, particularly an oligomer represented by the formula $T_4E_4$ wherein T and E are defined as above.

The present invention also relates to an ethylene glycol bis-(anhydrotrimellitate) resin (also referred to as EGBAT resin) composition comprising the unpurified reaction product of trimellitic anhydride and ethylene glycol containing up to about 80% ethylene glycol bis-(anhydrotrimellitate), preferably up to about 70% ethylene glycol bis-(anhydrotrimellitate), with the remainder comprising a mixture of ethylene glycol bis-(anhydrotrimellitate) polymers/oligomers and unreacted trimellitic anhydride and the use of EGBAT resin for preparation of crosslinked cellulosic products with improved wet strength.

The present invention further relates to a hydrated ethylene glycol bis-(anhydrotrimellitate) resin (also referred to as hydrated EGBAT resin or HER) which comprises the reaction product of EGBAT resin with water and in which the anhydride groups have been opened to carboxylic acids and the use of hydrated EGBAT resin (HER) for preparation of crosslinked cellulosic products with improved wet strength.

DETAILS OF THE INVENTION

This invention relates to a process for preparation of crosslinked cellulosic products with improved wet strength which process comprises impregnating a fibrous cellulosic material containing at least 30 wt. % cellulosic fiber with an aqueous solution of an alkyl glycol bis(anhydrotrimellitate) as a polyanhydride of the structure

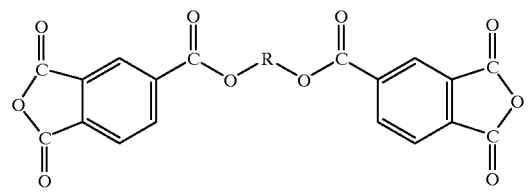

wherein R is selected from the group consisting of alkyl, alkylene, and cycloalkylene moieties of up to 30 carbon atoms, ethylene oxide moieties of molecular weights up to about 6000, and propylene oxide moieties of molecular weight up to about 6000. In a preferred embodiment, R is —$CH_2CH_2$—.

This invention accordingly relates to a process for preparation of crosslinked cellulosic products containing at least 30 wt. % cellulosic fiber with improved properties and to the fibrous cellulosic materials with improved properties resulting from the process. The invention is especially directed to a method of improving the wet strength characteristics of cellulosic products without modifying the desirable characteristics of the cellulosic products. The wet strength of paper is improved but the paper is readily repulped without the presence of a debonding agent. The resilience of pulp fluff is improved without excessive breakage under compressive forces encountered during use of the product such as in a diaper under wet conditions. Wood oriented strand board is improved by exhibiting less swelling when exposed to water. The durable press and shrink characteristics of textile fabrics are improved for use in wash-and-wear applications.

The crosslinked cellulosic products of the present invention are intended for use as manufactured or for incorporation into other products wherein their unique qualities add to the desirability of the final product. The present invention provides an improved wet strength crosslinked cellulosic product that can be easily reslurried to a free fiber condition without excessive breakage from sheeted products such as paper sheet. The resilience of pulp fluff products of this invention, in uses as disposable absorbent garments including diapers and incontinent products, tends to hold retained liquid to a greater extent than fluff products of less resiliency and thus subject to greater breakage of fibers. The improved durable press characteristics of textile fabric products of this invention improves the wearability characteristic of these products for wash-and-wear applications.

The present invention is directed to improvement of the wet strength of fibrous cellulosic material containing at least 30 wt. % cellulosic fiber including cotton, jute, flax, hemp, wheat, and regenerated wood cellulose such as rayon. The invented process can be applied to fibrous cellulosic material in the form of non-woven and woven textiles such as woven and knit fabrics, and to yarns, fibers, linters, roving, slivers, paper, pulp fluff, and wood oriented strand board. The invented process is especially advantageous with cellulosic materials containing greater than about 50 wt. % cellulosic fiber such as cotton with about 90 wt. % cellulose, coniferous woods with about 60 wt. % cellulose, and rayon.

The invented process utilizes an aqueous solution of a polycarboxylic acid formed by hydrolysis of an alkyl glycol bis(anhydrotrimellitate), as a polyanhydride, or polyacid or partial carboxylate salt of the structure, shown as the anhydride, which comprises the reaction product of trimellitic anhydride and a diol.

Examples of the diols which can be used in the present invention include alkylene glycols, e.g., ethylene glycol, propylene glycol, butylenediol, neopentyl glycol, decamethylene glycol, dodecamethylene glycol, etc., cycloalkylene glycols, e.g., cyclopentanediol, cyclohexanediol, cyclohexanedimethanol, etc., alkenylene glycols, e.g., butenediol, octenediol, etc., polyalkylene glycols, e.g., diethylene glycol, dipropylene glycol, triethylene glycol, polyethylene glycol, etc., ethylene oxide adducts of bisphenol A, ethylene oxide adducts of hydrogenated bisphenol A, and the like.

Preferable diols useful in the process of this invention include ethylene glycol, diethylene glycol, oligomers and polymers of ethylene oxide up to molecular weight of about 6000, propylene glycol, dipropylene glycol, oligomers and polymers of propylene oxide up to molecular weight of about 6000, 1,3-propanediol, 1,6-hexanediol, neopentyl glycol, 2-methyl-1,3-propanediol, 2-butyl-2-ethyl-1,3-propanediol and cyclohexanedimethanol.

The above list of examples of diols is for exemplary purposes only and is not intended to be all inclusive or restrictive.

It is considered that the reaction between trimellitic anhydride (TMA) and ethylene glycol in a 2:1 ratio is as follows:

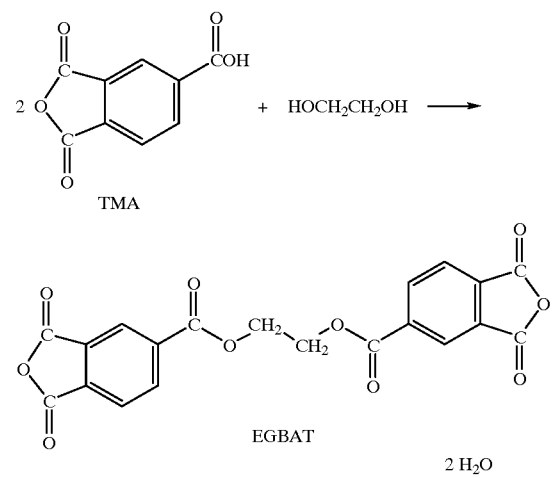

Other potential ester reaction products are considered to be:

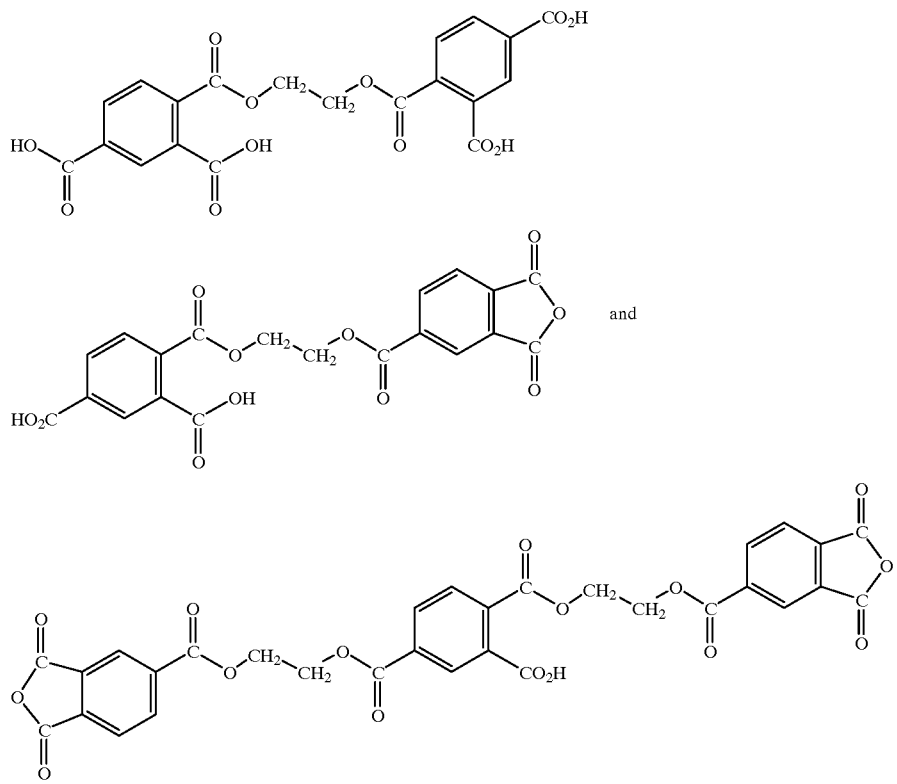

Potential hydrolyzed ester reaction products are considered to include:

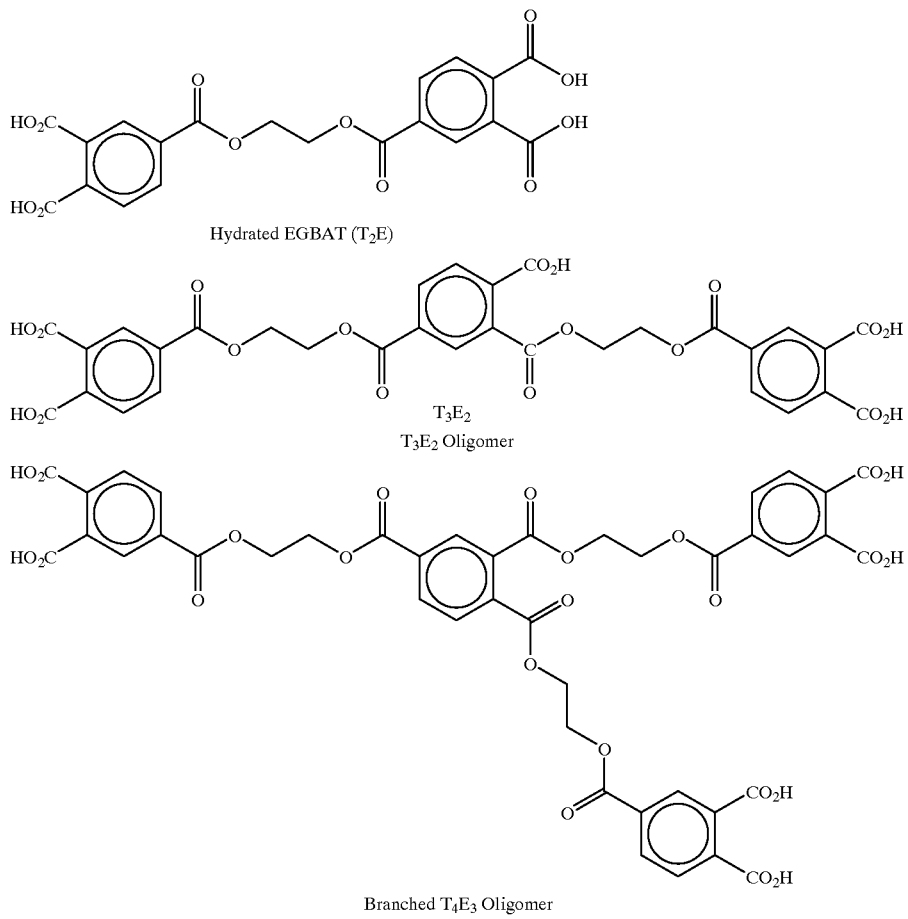

Hydrated EGBAT (T$_2$E)

T$_3$E$_2$ Oligomer

Branched T$_4$E$_3$ Oligomer

The polyanhydride is prepared as the reaction product of trimellitic anhydride and a diol in the mole ratio of from about 2.0:0.6 to about 2.0:1.5, preferably from about 2.0:0.9 to about 2.0:1.1, and more preferably 2.0:1.0. Aqueous solutions of the polyanhydride are used to treat cellulosic substrates such as paper, pulp fluff, wood board, and fibers and fabrics containing at least 30 wt. % cellulosic fiber at a temperature up to 100° C. at ambient pressure to obtain a wet pickup of said anhydride within the range of from about 0.25 to about 10% of the dry weight of said cellulosic material. The impregnated cellulosic material is predryed at a temperature within the range of from about 25° C. to about 170° C. at ambient pressure. The treated substrate is thereupon thermally cured at a temperature within the range of from about 120° C. to about 200° C. at ambient pressure to obtain crosslinking of the cellulose with the polyanhydride with an ester bond. The thermal curing of the impregnated cellulosic material causes formation of an ester bond between hydroxyl groups of the cellulosic fibers and anhydride groups of the polyanhydride. The presence of a catalyst, such as a phosphorus compound, is optional during the curing step.

In the process of the present invention cellulose fibers are impregnated with an amount effective for crosslinking of a crosslinking composition comprising water-soluble polymers, especially oligomers, which have been produced by reacting trimellitic anhydride with at least one diol so that the polymers/oligomers obtained have free acid groups and have an average molecular weight, Mw, of between about 400 and about 1000, preferably of between about 440 and about 920, and more preferably of between about 440 and about 800, and then drying the cellulose fibers and crosslinking the impregnated cellulose fibers in the dry state by heating at a temperature of between about 100° C. to about 200° C., preferably between about 150° C. and about 180° C.

A preferred embodiment of the invention relates to the use of water-soluble oligomers derived from reacting TMA and ethylene glycol to crosslink cellulose fibers by reacting the cellulose with an effective crosslinking quantity of one or more water-soluble oligomers having an average molecular weight, Mw, of between about 400 and about 1000 glmol, preferably between about 440 and 920 g/mol.

The present invention also relates to a process wherein cellulose fibers are impregnated with an amount effective for crosslinking of a crosslinking composition comprising a mixture of water-soluble polymers/oligomers which have been produced by reacting trimellitic anhydride (TMA) with at least one diol, preferably ethylene glycol, followed by hydrolysis so that the polymers/oligomers obtained have free acid groups and then drying the cellulose fibers and crosslinking the impregnated cellulose fibers in the dry state by heating at a temperature of between about 100° C. to about 200° C., preferably between about 150° C. and about 180° C. wherein said crosslinking composition comprises a mixture of water-soluble polymers, especially oligomers, which comprise reaction products of the type $T_{n+1}D_n$, wherein T is that part of the oligomer molecule which is derived from TMA and D is that part of the oligomer molecule which is derived from a diol and wherein n is about 1 to about 20, preferably about 1 to about 12. The crosslinking mixture may also contain oligomers of the formula $T_mD_m$ wherein T and D are defined as above and wherein m is at least 4, especially $T_4D_4$ wherein T and D are defined as above. The polymers/oligomers have functional groups, such as carboxyl, which can react with the hydroxyl groups of the cellulose on heating, and, if desired, in the presence of a catalyst. A preferred embodiment of the invention relates to a process wherein cellulose fibers are impregnated with an amount effective for crosslinking of a crosslinking composition comprising a mixture of water-soluble polymers/oligomers which have been produced by reacting trimellitic anhydride (TMA) ethylene glycol, followed by hydrolysis so that the polymers/oligomers obtained have free acid groups and then drying the cellulose fibers and crosslinking the impregnated cellulose fibers in the dry state by heating at a temperature of between about 100° C. to about 200° C., preferably between about 150° C. and about 180° C. wherein said crosslinking composition comprises a mixture of water-soluble polymers, especially oligomers, which comprise reaction products of the type $T_{n+1}E_n$ where T is a trimellitate moiety and E is an ethylene glycol moiety and wherein n is about 1 to about 20, preferably about 1 to about 12. The reaction product may also contain oligomers of the formula $T_mE_m$ wherein T and E are defined as above and m is at least 4, particularly an oligomer represented by the formula $T_4E_4$ wherein T and E are defined as above.

The present invention additionally relates to a process for preparing crosslinked cellulosic materials with improved wet strength comprising impregnating a fibrous cellulosic material containing at least about 30 wt. % cellulosic fiber with an aqueous solution of an ethylene glycol bis-(anhydrotrimellitate) resin (EGBAT resin) composition comprising the hydrolyzed unpurified reaction product of trimellitic anhydride and ethylene glycol containing up to about 80% ethylene glycol bis-(anhydrotrimellitate), preferably up to about 70% ethylene glycol bis-(anhydrotrimellitate), drying the impregnated cellulosic material, and thermally curing the impregnated cellulosic material to obtain crosslinking of the cellulose with the EGBAT resin at 120° C.–200° C., preferably 148° C.–195° C., more preferably 171° C.–193° C.

The present invention further relates to a hydrated ethylene glycol bis-(anhydrotrimellitate) resin (also referred to as hydrated EGBAT resin or HER) which comprises the reaction product of EGBAT resin with water and in which the anhydride groups have been opened to carboxylic acids and the use of hydrated EGBAT resin (HER) for preparation of cellulosic materials with improved wet strength comprising impregnating a fibrous cellulosic material containing at least about 30 wt. % cellulosic fiber with hydrated EGBAT resin, drying the impregnated cellulosic material, and thermally curing the impregnated cellulosic material to obtain crosslinking of the cellulose with the EGBAT resin.

Reaction of trimellitic anhydride (TMA) with ethylene glycol (EG) at a mole ratio range from about 2.0:0.6 to about 2.0:1.5 (TMA:EG) produces a resin which contains 5-isobenzofurancarboxylic acid, 1,3-dihydro-1,3-dioxo-, 1,2-ethanediyl ester (I), higher molecular weight oligomers of TMA and EG, as well as unreacted TMA. These resins can be added to water to produce highly concentrated solutions of the polycarboxylic acids corresponding to the polyanhydrides. In the absence of a sufficient amount of oligomer, the water solubility of 1,2,4-benzenetricarboxylic acid, 4,4'-(1,2-ethanediyl) ester (II), the polycarboxylic acid derived from 1, is very low.

The polycarboxylic acid crosslinking agents derived from the reaction of trimellitic anhydride and a diol may be present in a variety of forms, such as the free acid form and salts thereof. Although the free acid form is preferred, all such forms are meant to be included within the scope of the invention.

The present invention includes the hydrated reaction products of trimellitic anhydride with ethylene glycol, and their aqueous solutions and salts thereof. The composition advantageously contains enough oligomer to enhance the solubility of (11) to a level above about 0.2%, which is its solubility in pure form. This is accomplished with resins prepared using mole ratios of TMA:EG ranging from 2.0:0.6 to 2.0:1.5. Similar results are obtained when propylene glycol or 1,3-propane diol is substituted for ethylene glycol and reacted with TMA and the hydrated reaction products of TMA and propylene glycol as well as TMA and 1,3-propane diol are included in the present invention.

Oligomers of trimellitic anhydride (T) and ethylene glycol (E), containing n E groups and n+1 T groups (expressed as $T_{n+1}E_n$), where n ranges from 1 to 12 have been identified in the reaction product of trimellitic anhydride and ethylene glycol using a procedure called Matrix Assisted Laser Desorption/Ionization Time of Flight Mass Spectrometry (MALDI-TOF MS).

In MALDI-TOF MS, solutions of sample and a matrix compound are prepared and combined on the sample holder. The solvent is evaporated to produce a matrix of sample and matrix compound. The holder is placed inside the MS chamber, pumped down to high vacuum, and pulsed with a laser. The matrix compound absorbs strongly in the region of the laser's wavelength, transfers some of its excitation energy to the sample, which then ionizes and is accelerated into the MS detector. The time of flight of each individual ion is measured, and that data is converted to a mass:charge ratio. The procedure does not result in any fragment ions, so only molecular ions are detected. In the procedure, the masses of the ions detected correspond to the sample's masses plus a positive ion such as $H^+$, $Na^+$, or $K^+$. In the case of our samples, the metalating species was generally sodium. The matrix compound used was 2,5-dihydroxybenzoic acid (DHB) with tetrahydrofuran (THF) as solvent, and MALDI-TOF MS was run at two different laser intensities.

Using MALDI-TOF MS the following compounds were identified in the hydrated EGBAT resin composition $T_2E$, $T_3E_2$, $T_4E_3$, $T_5E_4$, $T_6E_5$, $T_7E_6$, $T8E_7$, $T_9E_8$, $T_{10}EG$, $T_{11}E_{10}$, $T_{12}E_{11}$, and $T_{13}E_{12}$. Also found were the mono-anhydride, $T_4E_3$-$H_2O$, the trianhydride $T_4E_3$-$3H_2O$, and the monoanhydride, $T_4E_4$-$H_2O$, in which the number of ethylene glycol groups is not one less that the number of trimellitate groups.

MALDI-TOF MS analysis of the oligomeric structures also revealed that branched structures exist among the oligomers. For example $T_4E_3$, in addition to existing as the mono- and dianhydrides, also exists as the trianhydride. A trianhydride is possible from a branched structure with a central trimellitate attached to three ethylene glycols, each terminated with a trimellitic anhydride.

It is considered that the polyanhydride in an aqueous solution is hydrolyzed to the polyacid as the hydrolyzed product and is the active ingredient in the solution. It is considered that the active ingredient which reacts with the hydroxyls of the cellulose to form the ester bond is the polyanhydride, which is regenerated from the polyacid under the elevated temperature curing conditions.

Catalysts optionally useful for thermally curing the treated substrate include alkali metal salts of phosphorous, phosphoric and hypophosphorous acids, preferably sodium salts, such as $NaH_2PO_2$, $NaH_2PO_3$, and $NaH_2PO_4$. Lithium and potassium salts can also be used as catalysts, such as $LiH_2PO_4$, $KH_2PO_2$, $KH_2PO_3$ and $KH_2PO_4$. However, it has been found that an effective curing process can be obtained without a catalyst or in the presence of a water soluble basic hydroxide such as ammonium hydroxide and an alkali metal hydroxide, i.e., lithium hydroxide, sodium hydroxide and potassium hydroxide, in an amount sufficient to partially neutralize the acyl groups of the polyanhydride or acid so as to obtain a degree of acidity represented by a pH within the range of from about 1.5 to about 10. In the presence or absence of a catalyst, wherein a base is used to control the pH, ammonium hydroxide is the preferred base. Ammonium hydroxide is removed during the thermal cure of the treated substrate by heating the substrate to a temperature within the range of from about 120° C. to about 200° C. at ambient pressure, preferably about 148° C. to about 195° C., more preferably about 171° C. to about 193° C.

The present invention also relates to an ethylene glycol bis-(anhydrotrimellitate) resin (also referred to as EGBAT resin) composition comprising the unpurified reaction product of trimellitic anhydride and ethylene glycol containing up to about 70% ethylene glycol bis-(anhydrotrimellitate) with the remainder comprising a mixture of ethylene glycol bis-(anhydrotrimellitate) oligomers and unreacted trimellitic anhydride and the use of EGBAT resin for preparation of crosslinked cellulosic products with improved wet strength.

The present invention further relates to a hydrated ethylene glycol bis-(anhydrotrimellitate) resin (also referred to as hydrated EGBAT resin or HER) which comprises the reaction product of EGBAT resin with water and in which the anhydride groups have been opened to carboxylic acids as well as the use of such hydrated EGBAT resin (HER) for preparation of crosslinked cellulosic products with improved wet strength.

It has been surprisingly discovered that hydrated EGBAT resin is unexpectedly very water soluble.

In general, aromatic acids are not water soluble or have very low solubility. For example, trimellitic acid (TMLA) has a solubility of about 1.9 wt. % at room temperature. Ethylene glycol bis-(anhydrotrimellitate) (EGBAT) which can be purchased in research quantities at a purity of 98% has a water solubility of about 0.2% wt. % at room temperature. The commercial EGBAT (TMEG-200), which is in the anhydride form, is believed to be purified by recrystalliztion in an organic solvent as that is the method that is described in the chemical literature for recrystallizing anhydride compositions.

Hydrated EGBAT (HE) which is the reaction product of EGBAT with water, in which the anhydride groups have been opened to carboxylic acids also has very low solubility; however, it has been unexpectedly discovered that hydrated EGBAT resin and water solutions containing hydrated EGBAT resin are very soluble. Hydrated EGBAT resin has a water solubility of about 55 wt. % at room temperature. Hydrated EGBAT resin also exhibits better than expected cellulose crosslinking ability. Since it contains a significant amount of TMLA, which by itself is an ineffective crosslinker, the crosslinking effectiveness of HER is even more surprising. These properties are summarized below.

| Composition | Water Solubility (wt. %; Room Temp.) | Cellulose Crosslink Effectiveness |
| --- | --- | --- |
| TMLA | 1.9 | poor |
| Hydrated EGBAT | 0.2% | good |
| Hydrated EGBAT resin | >55% | best |

Advantageously at least about 10 wt. % of the EGBAT resin will comprise oligomers derived from the reaction between molten TMA and EG. If the EGBAT resin contains less than about 10 wt % of such oligomers, precipitation may occur. Using a mole ratio of about 2.0 TMA to about 0.6 EG gives an EGBAT resin having about 10 wt % oligomers.

The hydrated reaction product of a 2:1 mole ratio of TMA:EG, which is particularly preferred, contains about 12 to about 15 wt % TMLA, about 60 wt % $T_2E$, with the balance being oligomers of the formula $T_{n+1}E_n$ and $T_mE_m$ where T, E, n and m are defined as hereinbefore.

The reaction of TMA with EG or other diols such as propylene glycol (PG); 1,3-propanediol (1,3PD); 1,4-butanediol (1,4BD); 2-methyl-1,3-propanediol (MP-Diol); diethylene glycol (DEG); and neopentyl glycol (NPG) is typically carried out by addition of the diol to molten TMA. The resulting molten product can be a solid ground to a powder or, in the case of TMA:EG, TMA:PG, or TMA:1, 3PD, poured directly into hot (at least about 70° C., preferably about 90–100° C.) water with mixing to produce a water soluble concentrate (about 50 weight percent of the TMA:Diol reaction product in water is preferred).

If the EGBAT resin produced by adding ethylene glycol to molten TMA is cooled the resulting solid anhydride resin is obtained. It is difficult to go from this solid anhydride to a water solution, but it can be done by powdering the anhydride and then placing it in a high humidity atmosphere and allowing it to hydrolyze to the acid (hydrated EGBAT resin) and then dissolving the hydrated EGBAT resin in water.

However, if the liquid anhydride (EGBAT resin) prepared by adding ethylene glycol to molten TMA is poured into hot (at least about 70° C.) water, it dissolves readily because the anhydrides are opened to acids. Being able to go from the liquid EGBAT resin to the water solution of hydrated EGBAT resin without having to isolate a solid provides a significant processing advantage and saves on time and on costs associated with isolating a solid and converting it to the acid and then dissolving it in water.

The liquid EGBAT resin may be dissolved in water at a temperature of at least about 70° C. with mixing at ambient pressure. The EGBAT resin dissolves more readily at higher temperatures, i.e., at least about 80° C., and even more readily at a temperature of from about 90° C. to about 100° C. at ambient pressure. The EGBAT resin may be dissolved in water at higher temperatures under pressure, however, if the temperature is too high it may cause the ester bond to hydrolyze to trimellitic acid (TMLA) which is undesirable.

Attempts to hydrolyze and dissolve molten EGBAT resin in water at temperatures of 25° C., 42° C. and 55° C. by adding the molten EGBAT resin slowly to water with mixing in a Waring blender were unsuccessful as in all cases the molten EGBAT resin solidified, sticking to various parts of the blender.

Any solution of hydrated EGBAT resin that contains greater than about 0.2 wt % $T_2E$ due to the concentration of oligomers, which enhance the water solubility of $T_2E$, may be used to treat cellulose fibers to enhance their wet strength and is included in the present invention.

A preferred solution will contain about 50 wt % of hydrated EGBAT resin. The pH of such a solution is typically about 1.3. For shipping purposes, a pH of 2.0 or greater is preferable, and, if desired the pH of an aqueous solution of hydrated EGBAT may be raised by the addition of a base. Suitable bases are ammonium hydroxide, and alkali metal hydroxides such as sodium hydroxide, potassium hydroxide, and lithium hydroxide either alone or as mixtures of two or more bases. Lithium hydroxide is preferred as it is less likely to cause precipitation when used to adjust the pH.

When TMA is reacted with propylene glycol (PG) and 1,3-propanediol (1,3-PD) and the reaction product is poured into hot (at least about 70° C.) water, a solution of hydrated reaction product which may be used to treat cellulose fibers to enhance wet strength is also obtained.

The reaction products of TMA and other diols, such as 2-methyl-1,3-propanediol, diethylene glycol, and neopentyl glycol are not soluble as the concentrate; however, they may be solubilized by preparing a dilute (at least about 0.5 wt %) mixture of the reaction product in water and neutralizing the acid moieties with base to produce a composition which may be used to treat cellulose to enhance wet strength. Suitable bases include, but are not limited to, ammonium hydroxide and metal hydroxides, such as sodium hydroxide, potassium hydroxide, and lithium hydroxide.

An attempt was made to prepare a TMA:glycerol reaction product at a mole ratio of 2.0:0.66, however, the reaction mixture gelled into an unusable mass before the reaction was completed. Reaction mixtures of TMA:EG at 2.0:1.7 and at 1:1 mole ratios also gelled and were unusable.

The following examples are illustrative of the present invention but are not intended to be limiting thereof.

EXAMPLE 1

The following example illustrates the preparation of ethylene glycol bis-(anhydrotrimellitate) (EGBAT). Ethylene glycol bis-(anhydrotrimellitate) was prepared without purification by the following method: trimellitic anhydride (192.13 grams) and ethylene glycol (31.03 grams) were charged to a 500 ml round bottom, four neck flask fitted with an overhead stirrer, steam jacketed partial condenser, thermocontroller, electric heating mantle, and nitrogen sparge tube. The reaction mass was stirred, sparged with nitrogen, and heated to 250° C. at ambient pressure over a one hour period and maintained at 250° C. at ambient pressure for an additional 3 hours with removal of water through the partial condenser. The contents of the reactor were cooled to room temperature and became a glassy solid weighing 199.8 grams. A total of 17.8 grams liquid condensate was collected for a mass balance of 97.4%. The reaction product had the following analyses: hydrolysis acid number=549.7 mg KOH/g (theor.=546.9); methanolysis acid number=310.47 mg KOH/g (theor.=273.4). This material was designated EGBAT, sample no. 122-B.

EXAMPLE 2

The following example illustrates the improvement of paper wet tensile strength obtained with various curing agents.

The paper was made from a furnish consisting of 70% bleached hardwood Kraft and 30 wt. % bleached softwood Kraft with no additives and a Canadian Standard Freeness of 400 ml., TAPPI method T2270M-94, Technical Association of Pulp and Paper Industries, Atlanta, Ga. The roll weighed 40 lbs/3000 square feet. Curing solutions were prepared from various acids and anhydrides and mono-sodium phosphate catalyst according to the Table 1 below. The curing agents tested were BTCA (1,2,3,4-butanetetracarboxylic acid), Aldrich Chemical Co. Inc., Milwaukee, Wis., TMA (trimellitic anhydride), Amoco Chemical Co. Inc., Chicago, Ill., TMEG-200 (ethylene glycol -bis(anhydrotrimellitate)) which was purchased in 95% purity from Chriskev Company Inc., Leawood, Kans., who designate that grade as TMEG-200), PMA (pyromellitic acid), Amoco Chemical Co., Chicago, Ill., and citric acid, Aldrich Chemical Co. Inc., Milwaukee Wis.. Paper samples were cut from the roll into 6×12 inch sheets, dipped in the curing solution for 30 seconds, padded to remove excess moisture, weighed, dried at room temperature for one hour and cured in a Blue M laboratory oven, General Signal, Blue Island, Ill., for 5 minutes at 320° F. The sheets were cut into 1×6 inch strips for tensile strength measurements (5 each, wet and dry) using an Instron.

For the control, in which water alone was used as the curing solution, the wet strength of the cured paper was only 1.5% of its dry strength. The paper cured with the solution prepared from trimellitic anhydride had a slightly increased wet strength of 8.9% of its dry strength, while TMEG-200 gave a wet strength of 34.8% at the same concentration. This is very similar to the 35.7% wet strength provided by the BTCA benchmark. This equal weight comparison of TMEG-200 to BTCA was augmented by an equal mole comparison, by increasing the TMEG-200 curing solution concentration from 1.0% to 1.74%. This gave a wet strength of 38.4%, exceeding that of BTCA. Citric acid was also tested and it gave a modest wet strength of 13.0%. These results show that while TMA itself provides only slight wet strength improvement, the ethylene glycol-linked derivative, TMEG-200, provides excellent wet strength. Details are in Table 1.

TABLE 1

Paper Wet Strength from Various Curing Agents

| | | | grams/400 g solution run # | | | | | | |
|---|---|---|---|---|---|---|---|---|---|
| Component | F.W. | Source | 1 | 2 | 3 | 4 | 5 | 6 | 7 |
| BTCA | 234 | Aldrich | 4 | | | | | | (control) |
| TMA | 192 | Amoco | | 4 | | | | | |
| TMEG-200 | 410 | Chriskev | | | 4 | 6.96 | | | |
| PMA | 254 | Amoco | | | | | 4 | | |
| Citric Acid | 192 | Aldrich | | | | | | 4 | |
| NaH$_2$PO$_4$ | 120 | Aldrich | 2.04 | 1.88 | 1.16 | 2.04 | 1.88 | 1.88 | |
| Water distilled | | | | | dilute to 400 grams with water | | | | 400 |

TABLE 1-continued

Paper Wet Strength from Various Curing Agents

| | | | grams/400 g solution run # | | | | | |
|---|---|---|---|---|---|---|---|---|
| Component | F.W. Source | 1 | 2 | 3 | 4 | 5 | 6 | 7 |
| Results | | | | | | | | |
| wet pick-up (wt. %) | | 171 | 178 | 174 | 177 | 178 | 181 | 193 |
| wt. % load on paper[1] | | 2.6 | 2.6 | 2.2 | 4.0 | 2.6 | 2.7 | 0 |
| avg. tensile strength[2] (lb/in) | | | | | | | | |
| wet tensile strength | | 7.80 | 1.58 | 6.98 | 9.29 | 6.93 | 2.49 | 0.29 |
| dry tensile strength | | 21.82 | 17.76 | 20.08 | 24.18 | 19.66 | 19.12 | 20.12 |
| % wet/dry | | 35.7 | 8.9 | 34.8 | 38.4 | 35.2 | 13.0 | 1.5 |

[1]% solution pick-up times the solids content of the solution, including catalyst.
[2]Data on uncured paper: % w/d = 0.9; dry tensile = 21.0, s.d. = 0.7; wet tensile = 0.19, s.d. = 0.04

EXAMPLE 3

This example demonstrates the effectiveness of this invention with and without a crosslinking catalyst. Curing solutions were prepared as listed in Table 2 and paper was treated and cured as in Example 2. Two sources of the ethylene glycol bis-(anhydrotrimellitate) were used, that prepared in Example 1 and the commercial sample from Chriskev Company, Inc., Leawood, Kans. In all cases, curing solutions were prepared both with and without monosodium phosphate as catalyst.

One sample of each solution was prepared, applied to paper substrates and cured. Wet and dry tensile strength (T.S.) were determined on 5 test strips for each sample. Standard deviation (S.D.) of wet and dry tensile strength for each group of strips was calculated. In every example, the presence of the catalyst improved the paper wet tensile strength.

The invented process using EGBAT and TMEG-200, b and d, outperformed the catalyzed benchmark BTCA system, f. Even the uncatalyzed systems, a and c, did as well as the catalyzed BTCA system, f. Data are in Table 2.

TABLE 2

| | Source | | Grams per 400 gram solution Run # | | | | | | | | |
|---|---|---|---|---|---|---|---|---|---|---|---|
| Component | Ref. | F.W. | a | b | c | d | e | f | g | h | i | Control |
| EGBAT | 122-B | 410 | 2 | 2 | 0 | 0 | 0 | 0 | 0 | 0 | 0 | 0 |
| TMEG-200 | Chriskev | 410 | 0 | 0 | 2 | 2 | 0 | 0 | 0 | 0 | 0 | 0 |
| BTCA | Aldrich | 234 | 0 | 0 | 0 | 0 | 2 | 2 | 0 | 0 | 0 | 0 |
| Citric Acid | Aldrich | 192 | 0 | 0 | 0 | 0 | 0 | 0 | 2 | 2 | 0 | 0 |
| TMA | Amoco | 192 | 0 | 0 | 0 | 0 | 0 | 0 | 0 | 0 | 1.87 | 0 |
| Ethylene glycol | | 62 | 0 | 0 | 0 | 0 | 0 | 0 | 0 | 0 | 0.30 | 0 |
| $NaH_2PO_4$ | Aldrich | 120 | 0 | 0.58 | 0 | 0.58 | 0 | 1.03 | 0 | 1.25 | 0.58 | 0 |
| Water | | | Dilute to 400 grams | | | | | | | | | |

| Cure at 320° F. for 5 minutes | | | | | | | | | |
|---|---|---|---|---|---|---|---|---|---|
| | a | b | c | d | e | f | g | h | i | Control |
| dry wt. | 2.81 | 2.82 | 2.83 | 2.94 | 2.85 | 2.78 | 2.84 | 2.79 | 2.82 | 2.80 |
| wet wt. | 7.65 | 7.60 | 7.72 | 7.72 | 7.71 | 7.55 | 7.63 | 7.51 | 7.63 | 8.17 |
| % wet wt. gain | 172 | 170 | 173 | 172 | 171 | 172 | 169 | 169 | 171 | 192 |
| wet T.S. | 4.01 | 5.20 | 3.51 | 4.87 | 1.41 | 3.58 | 1.14 | 2.17 | 1.71 | 0.11 |
| dry T.S. | 20.84 | 20.78 | 20.98 | 21.00 | 20.56 | 20.30 | 20.03 | 19.01 | 18.98 | 19.06 |
| % wet/dry | 19 | 25 | 17 | 23 | 7 | 18 | 6 | 11 | 9 | 0.57 |
| wet S.D. | 0.36 | 0.35 | 0.33 | 0.25 | 0.21 | 0.44 | 0.18 | 0.14 | 0.17 | 0.45 |
| dry S.D. | 1.43 | 1.31 | 0.68 | 0.62 | 0.88 | 0.89 | 0.91 | 1.68 | 0.94 | .078 |

S.D. - Standard Deviation of 5 samples

EXAMPLE 4

This example illustrates a preferred procedure for preparation of ethylene glycol bis(anhydrotrimellitate (EGBAT)) with a 2:1 mole ratio of TMA to ethylene glycol.

Trimellitic anhydride (TMA, 384.26 grams) was charged to a 1 liter round bottom, four neck flask fitted with an overhead stirrer, steam jacketed partial condenser, thermocontroller, electric heating mantle, and nitrogen sparge tube. The TMA was heated past its melting point to 225° C. and ethylene glycol (62.07 grams) was added with vigorous agitation over a 15 minute period, maintaining a temperature of 225° C. at ambient pressure. Water was removed through the partial condenser as the temperature was raised to 250° C. at one ambient pressure over a 40 minute period and held at 250° C. at ambient pressure for an additional 2 hours and 20 minutes. The reaction product, identified as 19026-185C was poured into a metal can, weighed 407.6 grams, and had the following analyses: hydrolysis acid number=540.66 mg KOH/gram (theor.= 546.9); methanolysis acid number =324.87 (theor.=273.4).

The above process was repeated two times varying only the amount of ethylene glycol used (55.86 grams, 68.28 grams) to prepare EGBAT with TMA:EG mole ratios of 2:0.9, 2:1.0, and 2:1.1. The ability of these three products to impart wet strength to paper was compared according to the procedure of Example 2. The results are summarized in Table 3. All products impart similar wet strength but the product with the 2:1.1 mole ratio of TMA:EG did not dissolve in water as readily as the other two.

TABLE 3

Paper Wet Strength Performance as a Function of TMA:EG Mole Ratio

| | grams per 400 gram solution | | |
|---|---|---|---|
| Component TMA:EG Mole Ratio | | | |
| Run | a | b | c |
| 2:0.9 | 2 | | |
| 2:1.0 | | 2 | |
| 2:1.1 | | | 2 |
| NaH$_2$PO$_4$ | 0.58 | 0.58 | 0.58 |
| Water | dilute to 400 g total solution | | |
| Results | | | |
| Wet T.S. | 4.3 | 4.5 | 4.8 |
| Dry T.S. | 20.9 | 22.0 | 22.2 |
| % Wet/Dry | 20.6 | 20.6 | 21.5 |
| Wet S.D.* | 0.14 | 0.12 | 0.33 |
| Dry S.D.* | 0.74 | 1.13 | 1.27 |

*S.D. is the standard deviation of the tensile strength test data based on 5 tests per sample The above data indicate that the reaction product of a TMA:EG mole ratio of from about 2:0.9 to about 2.0:1.1 improves the wet strength of fibrous cellulosic materials.

EXAMPLE 5

The following example illustrates the repulpability of wet strength paper treated with the monosodium salt of TMEG-200 (NaTMEG-200) in the presence of NaH$_2$PO$_4$ catalyst. Noble and Wood Handsheets were used. They are 8"×8" sheets weighing 3.0+/−0.1 g from 50/50 HWD/SWD with 335 Canadian Standard Freeness and no additives. The curing conditions are the same as Example 2.

Repulpability testing was performed using the Tappi Standard Disintegrator at 3000 rpm for 50,000 revolutions. The initial pH was 7.8 and final pH was 5.75. The initial temperature was 20° C. at ambient pressure and final temperature was 25° C. at ambient pressure. 6-cut rejects are the percentage of disintegrated paper that does not pass through a 0.006 inch slotted screen.

From these results much better repulpability is demonstrated for paper treated with NaTMEG-200 in the presence of NaH$_2$PO$_4$ than for similar paper made with a conventional cationic wet strength agent. Repulpability is typically more difficult at higher levels of wet strength. These results are actually better than the raw data indicate, since the paper used in the test has a higher wet strength than conventional paper and is still more readily repulped. Results are in Table 4.

TABLE 4

Repulpability of Wet Strength Paper

| | Wt. % in Water | |
|---|---|---|
| Component | | |
| Run | 1 | 2 |
| NaTMEG-200 | 0.9 | 0 |
| NaH$_2$PO$_4$ | 0.21 | 0 |
| Kymene 557LX[1] | 0 | present |
| Curing Results avg. tensile strength (lb/in) | | |
| wet | 50 | 4.5–5.1 |
| dry | 22.3 | 29.6–31.8 |
| % w/d | 22.4 | 15–16 |
| Repulpability Results | | |
| % 6 cut rejects | 0.97 | 8.0–9.4 |

[1]Commercial polyamidoamine/epichlorohydrin additive from Hercules.

EXAMPLE 6

The following example illustrates the effectiveness of EGBAT as an agent to form ester bonds with hydroxyls of cellulose fibers of textile fabric containing at least 30 weight % cellulosic fibers to prepare a durable press fabric in the presence or absence of phosphorus acid salt catalysts.

A cotton fabric containing at least 30 weight % cellulosic fiber was treated with EGBAT to demonstrate its effectiveness as a durable press and shrinkage control additive. An aqueous treating bath was prepared containing 6% by weight EGBAT. Two other solutions were prepared containing 6% EGBAT and the mono-sodium salts of hypophosphorus and phosphoric acids, at a 2:1 mole ratio to EGBAT.

Cotton fabric samples (Style 400, bleached cotton print cloth from Test Fabrics Inc., Middlesex, N.J.) measuring 33.0 cm wide by 109.0 cm long were padded to wet add-ons ranging from 70–80% on weight of fabric. A Werner Mathis 2-Bowl Type HVF vertical laboratory padder with a rubber bottom roll and rubber top roll was used. A single immersion was sufficient to obtain uniform finish application. Each sample was premarked at 99.0 cm in the warp direction and was placed after padding on a pin frame set at 99.0 cm to insure constant tension from sample to sample. Drying was at 107° C. at ambient pressure for 120 seconds in one pass through a Benz Type TKFN-JR continuous laboratory oven. Curing was for 90 seconds at the specified temperature through the same oven. Air velocity for drying and curing was 15 m/sec, equally distributed on the top and the bottom sides of the horizontal fabric sample.

All samples were allowed to condition overnight at 66% relative humidity and 21° C. prior to testing. Standard methods were used to measure the fabric properties. Crease recovery angle (AATCC TM 66)), durable press rating (MTCC TM 128), and % shrinkage (AATCC TM 135) were measured after three home launderings and tumble dryings. The laundering was at 60° C., normal setting, 12-minute cycle, high water level with a 1.8 Kg load using Launette Special, a detergent similar to AATCC Standard Detergent 124. Tumble drying was at 71° C. for 30 minutes. Strip tensile (ASTM D5035) and tongue tear strength (ASTM D2261) were measured and strength retention was calculated by comparing the finished fabric to the unfinished fabric strength. Whiteness was measured according to ASTM E313 with a 2 degree observer and C illuminant (daylight).

The results are summarized in Table 5. Formaldehyde-containing (run #1) and a formaldehyde-free (run #2) commercial imidazolidone resins were run for comparison. The solution containing EGBAT without catalyst (run #3) gave durable press, crease recovery angle, and shrinkage results that are much better than the untreated control and very similar to the formaldehyde-free resin, demonstrating the effectiveness of this material as a cotton finishing additive. Addition of the catalysts (runs 4 and 5) did improve the strength and color, especially when sodium hypophosphite was used but did not improve the durable press properties.

TABLE 5

Finish Treatment of Cotton Fabric

| Component | Run # | | | | | |
|---|---|---|---|---|---|---|
| (wt. % in water) | 1 | 2 | 3 | 4 | 5 | Control |
| Freerez 900* | 11.72 | 0 | 0 | 0 | 0 | |
| Freerez NFR* | 0 | 12.25 | 0 | 0 | 0 | |
| Freecat LF* | 2.9 | 3.0 | 0 | 0 | 0 | |
| EGBAT | 0 | 0 | 6.0 | 6.0 | 6.0 | |
| $NaH_2PO_2 \cdot H_2O$ | 0 | 0 | 0 | 2.85 | 0 | |
| $NaH_2PO_4$ | 0 | 0 | 0 | 0 | 3.23 | |
| Results | | | | | | |
| pH | 3.6 | 3.7 | 1.6 | 1.9 | 2.3 | |
| Curing Temperature (deg. C.) | 163 | 163 | 200 | 200 | 200 | |

TABLE 5-continued

Finish Treatment of Cotton Fabric

| Component | Run # | | | | | |
|---|---|---|---|---|---|---|
| (wt. % in water) | 1 | 2 | 3 | 4 | 5 | Control |
| DP Rating | 3.5 | 2.25 | 2.5 | 2.67 | 2.5 | 1 |
| Crease Recovery Angle | 230 | 192 | 181 | 176 | 182 | 167 |
| % Shrinkage | | | | | | |
| Warp | 0.5 | 2.2 | 2.09 | 1.85 | 1.6 | 6.0 |
| Fill | 0 | 0.71 | 0.71 | 0.71 | 0.51 | 3.7 |
| % Tensile Strength Retained | | | | | | |
| Warp | 56.6 | 74.3 | 37.8 | 69.2 | 49.9 | 100 (56.9 lbs.) |
| Fill | 42.8 | 58.2 | 26.7 | 50.5 | 6.1 | 100 (41.6 lbs.) |
| Tear Strength Retained | | | | | | |
| Warp | 61.7 | 94.3 | 34.2 | 63.7 | 45.1 | 100 (1.93 lbs.) |
| Fill | 46.8 | 81.2 | 25.3 | 51.9 | 32.5 | 100 (1.54 lbs.) |
| Whiteness Index | 73.7 | 76.5 | 57 | 66 | 52 | 89 |

*From Freedom Textile Chemical Company, Charlotte, NC

EXAMPLE 7

This example (Table 6) compares three different phosphorus based catalysts for paper wet strength enhancement: hypophosphorous, phosphorous, and phosphoric acids and their monosodium salts, as well as an uncatalyzed system, in the presence and absence of systems containing 0.5, column b, and 1.0 moles, columns c-f, of NaOH per mole of TMEG-200. Curing solutions were prepared as shown in Table 6, and cured according to the procedure in Example 2. The relative effectiveness of the sodium salt catalysts are ranked in the same order as that reported for cotton durable press using BTCA as a catalyst ($NaH_2PO_2 > NaH_2PO_3 > NaH_2PO_4$) (columns d, e, f). The un-neutralized phosphorus based acids (columns g, h, and i) in the absence of NaOH are ineffective catalysts, and actually cause a reduction in the dry strength, presumably due to the low pH cure. The uncatalyzed system (a), provides substantial wet strength and a low level of sodium hydroxide also functions as a catalyst (column b), but higher levels of sodium hydroxide are ineffective (column c).

TABLE 6

Wet Strength Curing Solutions With A Variety of Catalysts

| | grams needed to prepare 400 g of a 1% solution | | | | | | | | |
|---|---|---|---|---|---|---|---|---|---|
| Component | a | b | c | d | e | f | g | h | i |
| 10% TMEG-200 | 40* | 40 | 40 | 40 | 40 | 40 | 40 | 40 | 40 |
| 2.0 m NaOH | 0 | 2.45 | 4.9 | 4.9 | 4.9 | 4.9 | 0 | 0 | 0 |
| 1.0 m $H_3PO_2$ | 0 | 0 | 0 | 9.8 | 0 | 0 | 9.8 | 0 | 0 |
| 1.0 m $H_3PO_3$ | 0 | 0 | 0 | 0 | 9.8 | 0 | 0 | 9.8 | 0 |
| 1.0 m $H_3PO_4$ | 0 | 0 | 0 | 0 | 0 | 9.8 | 0 | 0 | 9.8 |
| Water | dilute to 400 g total | | | | | | | | |
| Results | | | | | | | | | |
| pH | 2.04 | 2.44 | 2.83 | 2.10 | 2.15 | 2.31 | 1.64 | 1.65 | 1.86 |
| wet pick-up % | 174 | 173 | 175 | 173 | 176 | 173 | 172 | 176 | 176 |
| % loading on paper | 1.7 | 1.8 | 1.9 | 2.1 | 2.2 | 2.2 | 2.0 | 2.1 | 2.2 |

TABLE 6-continued

Wet Strength Curing Solutions With A Variety of Catalysts

| | grams needed to prepare 400 g of a 1% solution | | | | | | | | |
|---|---|---|---|---|---|---|---|---|---|
| Component | a | b | c | d | e | f | g | h | i |
| wet tensile (lb/in.) | 4.47 | 5.30 | 4.29 | 7.41 | 6.42 | 6.14 | 4.79 | 3.88 | 4.30 |
| dry tensile (lg/in.) | 19.0 | 21.0 | 21.0 | 20.7 | 20.5 | 20.5 | 17.4 | 16.1 | 17.1 |
| % wet/dry | 24 | 25 | 20 | 36 | 31 | 30 | 28 | 24 | 25 |

*9.8 m/moles

EXAMPLE 8

An analog of EGBAT [ethylene glycol bis(anhydrotrimellitate)] was prepared according to Example I by replacing ethylene glycol with half a mole of a 300 molecular weight polyethylene glycol (PEG-300 from Union Carbide Corp. Danbury, Conn.). The product had a hydrolysis acid number of 298 mg KOH/gram and a methanolysis acid number of 193 mg KOH/gram. The product was observed to be almost completely insoluble in water. Its effectiveness as a cellulose crosslinking agent was tested as an ammonium hydroxide salt and is included in Table 7.

This example demonstrates the effectiveness of using ammonium hydroxide to form clear solutions of the crosslinking agents of this invention. The data show that ammonium hydroxide treatment substantially controls the development of crosslinking and wet strength improvement, but that longer curing times or higher curing temperatures can substantially improve the degree of crosslinking, especially in the presence of a catalyst, $NaH_2PO_4$. These results are summarized in Table 7.

Relative performance data of ammonium hydroxide salts of EGBAT and PEG-300-BAT, (column C vs. column D), are presented and compared in Table 7. This comparison was made at equal molar concentration of the two crosslinking agents. The data indicate that PEG-300-BAT (column D) used as a cellulose crosslinking agent, provides greater wet tensile strength (lbs/in) than EGBAT (column C) with longer curing times and higher curing temperatures. The data indicates that crosslinking effectiveness is related to the nature of the alcohol group connecting the two trimellitate groups.

TABLE 7

Ammonium Hydroxide Salts as Cellulose Crosslinking Agents

| | A | B | C | D | Control (Water) |
|---|---|---|---|---|---|
| Curing Solution Component (wt. % in water) | | | | | |
| EGBAT | 0.50 | 0.50 | 0.50 | 0 | 0 |
| PEG-300-BAT | 0 | 0 | 0 | 0.79 | |
| $NH_4OH$ (30 wt. % solution | 0 | 0.47 | 0.50 | 0.20 | |
| $NaH_2PO_4$ | 0 | 0 | 0.12 | 0.12 | 0 |

TABLE 7-continued

Ammonium Hydroxide Salts as Cellulose Crosslinking Agents

| | A | B | C | D | Control (Water) |
|---|---|---|---|---|---|
| pH | 2.0 | 9.0 | 3.8 | 5.1 | 7.0 |
| Solution Clarity | hazy | clear | clear | clear | clear |
| Curing Conditions Temp (° F.)/Time (min.) | wet tensile strength (lbs./in) | | | | |
| 320/5 | 2.42 | 1.15 | 1.76 | 3.39 | 0.34 |
| 320/10 | 4.61 | 1.58 | 2.99 | 4.61 | |
| 320/15 | 4.43 | 1.78 | 2.98 | 5.08 | |
| 340/5 | 4.64 | 1.63 | 3.25 | 4.73 | |
| 360/5 | 5.45 | 2.30 | 4.16 | 6.13 | |

EXAMPLE 9

A typical reaction of trimellitic anhydride with ethylene glycol is conducted as follows. A 4-necked 500 ml round bottomed flask is equipped with an adapter for a nitrogen inlet and dropping funnel, stirrer, thermometer, and partial steam condenser with saddles connected to a Dean Stark trap and cold water condenser. Into this flask is placed 192 g (1.0 mole) of trimellitic anhydride. The TMA is heated to a melt at 170–180° C. and 31 g (0.5) mole of ethylene glycol is added to the melt over a period of 5 to 10 minutes resulting in a slight exotherm (~10° C.). The temperature is increased to 270° C. and 14–15 ml of distillate is collected in the Dean Stark trap. About 202 g of molten product is collected as a solid or, alternatively, this molten material can be cooled to about 180° C. and poured into 200 ml of hot (90–95° C.) water with stirring. The resulting clear concentrate is 50–70 wt % solids.

EXAMPLE 10

EVALUATION OF REACTION PRODUCTS FROM TMA AND EG AND ROM TMA AND OTHER DIOLS

Reaction products from trimellitic anhydride (TMA) and ethylene glycol (EG) were obtained at TMA:EG molar ratios ranging from 2:0.5 to 2:1.5. These products contain varying amounts of ethylene glycol bis-(anhydrotrimellitate) [EGBAT], TMA, and oligomeric resin and have been evaluated for crosslinking cellulose. Water solubility, hydrolysis number, methanolysis number, High Pressure Liquid Chromatography (HPLC), and paper wet strength were measured for each product. Comparison of these results with products made from TMA and different diols demonstrate effective cellulosic crosslinking for all products, but only TMA:EG and TMA:PG demonstrate a wide range of water solubility. However, the TMA-PG product contains high levels of TMA and is darker in color in the solid or concentrate form.

Reaction of TMA with EG or Other Diols

The reaction of TMA with EG or other diols such as propylene glycol (PG), 1,3-propanediol (1,3PD), 1,4-butanediol (1,4DB), 2-methyl-1,3-propanediol (MP-Diol), diethylene glycol (DEG), and neopentyl glycol (NPG) is typically carried out by addition of the diol to molten TMA. The resulting molten product can be a solid ground to a powder or in the case of TMA:EG, TMA:PG, or TMA:1,3PD poured directly into hot water producing a water soluble concentrate (~50 wt %). A typical reaction of TMA with EG at a 2:1 molar ratio is described in Example 9 above.

Characterization of TMA:EG and TMA:Diol Products

Products produced from the reaction of TMA and EG have been analyzed as a solid powder. There is a decrease in both acid number (695–411 mg KOH/g) and methanolysis number (425–223) as the TMA:EG molar ratio changes from 2:0.5 to 2:1.5. As shown by HPLC there is a decrease in the TMA content in the product; however the EGBAT concentration initially increases as the TMA:EG molar ratio varies from 2:0.5 to 2:0.9, but then decreases from a 2:1 to 2:1.5 TMA:EG molar ratio. A summary of some typical results is shown in the following table.

| Characterization of Various TMA:EG Products | | | | | | |
|---|---|---|---|---|---|---|
| TMA/EG (Moles) | 2:0.5 | 2:0.6 | 2:0.7 | 2:0.8 | 2:0.9 | |
| Acid Number (mg KOH/g) | | | | | | |
| Hydrolysis | 695 | 670 | 645 | 608 | 580 | |
| Methanolysis | 425 | 404 | 369 | 350 | 322 | |
| TMA WT % | 38.3 | 26.9 | 22.6 | 15.3 | 9.6 | |
| EGBAT WT % | 48.2 | 56.7 | 65.4 | 70.0 | 73.9 | |
| Oligomer content by difference, wt % | 13.5 | 16.4 | 12.0 | 14.7 | 16.5 | |
| TMA/EG (Moles) | 2:1 | 2:1.1 | 2:1.2 | 2:1.3 | 2:1.4 | 2:1.5 |
| Acid Number (mg KOH/g) | | | | | | |
| Hydrolysis | 544 | 522 | 499 | 474 | 443 | 411 |
| Methanolysis | 314 | 287 | 271 | 262 | 238 | 223 |
| TMA WT % | 10.8 | 9.2 | 4.0 | 2.7 | 2.3 | 1.9 |
| EGBAT WT % | 60.6 | 57.0 | 55.4 | 48.1 | 39.3 | 31.9 |
| Oligomer content by difference, wt % | 28.6 | 33.8 | 40.6 | 49.2 | 58.4 | 66.2 |

In addition to TMA and EGBAT, oligomers from TMA and EG are also present in these products. If the oligomeric material is considered to be everything other than TMA and EGBAT as measured by HPLC, then the oligomeric content appears to remain fairly constant at TMA:EG ratios less than 2:1. As the TMA:EG ratio changes from 2:1 to 2:1.5, the oligomeric content increases rapidly.

The products produced from TMA and other diols (PG, 1,3PD, 1,4BD, MP-Diol, DEG, and NPG) are prepared at a 2:1 molar ratio in a similar fashion to the reaction of TMA:EG and analyzed as a powder. The product from TMA and 1,4BD was very dark, contained very high levels of TMA (~60 wt %), and was not evaluated further. Examples of hydrolysis number, methanolysis number, and wt % TMA for the other products are shown.

| TMA:DIOL at 2:1 Molar Ratio | | | | | |
|---|---|---|---|---|---|
| Diol | PG | 1,3PD | MP-Diol | DEG | NPG |
| Acid Number (mgKOH/g) | | | | | |
| Hydrolysis | 617 | 532 | 526 | 362 | 504 |
| Methanolysis | 374 | 316 | 321 | 210 | 321 |
| TMA WT % | 34.6 | 20.0 | 20.5 | 5.9 | 25.4 |

All of these products are much darker than products from TMA:EG and contain high levels of TMA except for the DEG product. The low hydrolysis number, methanolysis number, and wt % TMA for the DEG product is probably due to hydrolysis of the ether linkage in DEG during the TMA:DEG reaction. This hydrolysis would produce some EG increasing the diol content in the reaction resulting in less free TMA and low acid numbers.

EXAMPLE 11

SOLUBILITY CHARACTERISTICS

When molten TMA is reacted with EG at TMA:EG mole ratios from 2.0:0.5 to 2.0:1.5 and poured into hot (at least about 70° C.) water, all samples except the 2.0:1.5 TMA:EG molar ratio product are initially soluble at 50 wt % solids concentration. At 2.0:0.5 TMA:EG molar ratio, solids precipitate from the concentrate on cooling while at the 2.0:1.5 TMA:EG molar ratio, solubility of the concentrate occurred only on standing in water for several weeks. The 2.0:0.6 TMA:EG concentrate developed a slight haze on cooling and a white recipitate after about 2 days while those concentrates made from TMA:EG molar ratios of 2.0:0.7, 2.0:0.8, and 2.0:0.9 developed white solids after a week. All concentrates prepared from 2.0:1.0 to 2.0:1.5 TMA:EG molar ratio products have remained stable for more than two months. When all concentrates are diluted to a typical concentration (0.5 wt %) for treating cellulose, the concentrates prepared from the 2.0:0.5 to 2.0:1.0 TMA:EG molar ratio products are clear while those from the 2.0:1.1 to 2.0:1.5 TMA:EG molar ratio products are hazy to milky; however, they can be clarified by neutralization with ammonium hydroxide.

While the reaction products of TMA:EG and TMA:PG show a wide range of water solubility, the reaction product of TMA:1,3-PD is soluble in water at high concentrations (50 wt %) but produces a milky solution at dilute concentrations (0.5 wt %). The reaction products of TMA and MP-Diol, DEG, and NPG respectively, are insoluble in water and solutions of each of these products were prepared for use in measuring paper wet strength by neutralizing water slurries of these reaction products with ammonium hydroxide.

Paper Wet Strength

The paper wet strength test compares the tensile strength of wet paper as a percentage of the tensile strength of dry paper where both papers have been chemically treated. This is calculated as % wet/dry. Paper wet strength measurements were made with the TMA:EG products prepared at various mole ratios and for products from TMA and various diols. A 0.5 wt % concentration of these materials is used to treat the paper. The TMA:EG products are applied to paper as a clear or milky water solution. The milky solutions were also neutralized with ammonium hydroxide to produce a clear solution and used to treat paper. Products made with TMA and 1,3PD, MP-Diol, DEG or NPG were slurried in water (0.5 wt %) and neutralized with ammonium hydroxide before application to paper. Wet paper that has not been treated with these products has no measurable tensile strength. All of the products tested were based on an average of 4–6 determinations for wet and dry measurements and showed a significant % wet/dry paper wet strength. Typical results from these measurements are shown in the following tables.

| Various TMA:EG Molar Ratios | | | | | |
|---|---|---|---|---|---|
| TMA:EG | 2:0.5 | 2:0.6 | 2:0.7 | 2:0.8 | 2:0.9 |
| % Wet/Dry | 21 | 20 | 22 | 19 | 22 |
| TMA:EG | 2:1 | 2:1.1 | 2:1.2 | 2:1.3 | 2:1.4 | 2:1.5 |
| % Wet/Dry | 24 | 26 | 24 | 25 | 33 | 29 |

| TMA:Diol at 2:1 Molar Ratio | | | | | |
|---|---|---|---|---|---|
| Diol | PG | 1,3PD | MP-Diol | DEG | NPG |
| % Wet/Dry | 19 | 22 | 21 | 24 | 23 |

Conclusion

The reaction of two moles of molten TMA with one mole of a diol produces a dianhydride, oligomers of TMA and the diol, and TMA. The distribution of these products will vary with the mole ratio of TMA to diol. Diols used in this reaction include ethylene glycol, propylene glycol, 1,3-propanediol, 2-methyl-1,3-propanediol, diethylene glycol, and neopentyl glycol. All products were shown to be effective in strengthening wet paper. The ethylene glycol and propylene glycol products also have good water solubility at various concentrations.

That which is claimed is:

1. A cellulose crosslinking composition comprising an aqueous solution containing at least 0.5 weight percent of a hydrolyzed reaction product of trimellitic anhydride and at least one diol in a mole ratio of from about 2.0:0.6 to about 2.0:1.5, wherein said hydrolyzed reaction product comprises:

a) a polycarboxylic acid formed by hydrolysis of an alkyl glycol bis(anhydrotrimellitate) as a polyanhydride of the structure

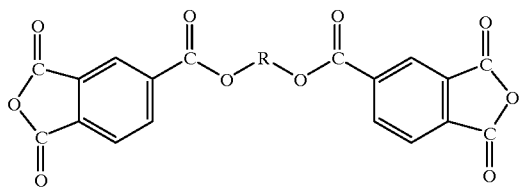

wherein R is selected from the group consisting of alkyl, alkylene and cycloalkylene moieties of up to 30 carbon atoms, ethylene oxide moieties of molecular weight up to about 6000, and propylene oxide moieties of molecular weight up to about 6000; and b) at least one oligomer represented by the formula $T_{n+1}D_n$, wherein T is that part of the oligomer molecule which is derived from trimellitic anhydride and D is that part of the oligomer molecule which is derived from a diol and wherein n is an integer of from 2 to 12.

2. The composition of claim 1 wherein the diol is selected from the group consisting of ethylene glycol, propylene glycol, 1,3-propanediol; oligomers and polymers of ethylene glycol up to molecular weight of about 6000; and oligomers and polymers of propylene glycol up to molecular weight of about 6000 and wherein the mole ratio of trimellitic anhydride to said diol is from about 2.0:0.9 to about 2.0:1.1.

3. The cellulose crosslinking composition of claim 1 comprising an aqueous solution containing at least 0.5 weight percent of the hydrolyzed reaction product of trimellitic anhydride and ethylene glycol in a mole ratio of from about 2.0:0.6 to about 2.0:1.5.

4. The cellulose crosslinking composition of claim 3 comprising an aqueous solution containing at least 0.5 weight percent of the hydrolyzed reaction product of trimellitic anhydride and ethylene glycol in a mole ratio of from about 2.0:0.9 to about 2.0:1.1.

5. The cellulose crosslinking composition of claim 1 comprising an aqueous solution containing at least 0.5 weight percent of the hydrolyzed reaction product of trimellitic anhydride and at a diol selected from the group consisting of 2-methyl-1,3-propanediol, diethylene glycol, and neopentyl glycol in a mole ratio of from about 2.0:0.9 to about 2.0:1.1 wherein said reaction product is hydrolyzed in the presence of a water soluble basic hydroxide selected from the group consisting of ammonium hydroxide and an alkali metal hydroxide.

6. The cellulose crosslinking composition of claim 1 wherein said aqueous solution contains from about 0.5 to about 65 weight percent of the hydrolyzed reaction product of trimellitic anhydride and at least one diol in a mole ratio of from about 2.0:0.6 to about 2.0:1.5.

7. The cellulose crosslinking composition of claim 6 wherein the diol is selected from the group consisting of ethylene glycol, propylene glycol, 1,3-propanediol; oligomers and polymers of ethylene glycol up to molecular weight of about 6000; and oligomers and polymers of propylene glycol up to molecular weight of about 6000 and wherein the mole ratio of trimellitic anhydride to said diol is from about 2.0:0.9 to about 2.0:1.1.

8. The cellulose crosslinking composition of claim 6 comprising an aqueous solution containing from about 0.5 to about 65 weight percent of the hydrolyzed reaction product of trimellitic anhydride and ethylene glycol in a mole ratio of from about 2.0:0.6 to about 2.0:1.5.

9. The cellulose crosslinking composition of claim 8 comprising an aqueous solution containing from about 6 to about 60 weight percent of the hydrolyzed reaction product of trimellitic anhydride and ethylene glycol in a mole ratio of from about 2.0:0.6 to about 2.0:1.5.

10. The cellulose crosslinking composition of claim 9 comprising an aqueous solution containing from about 50 to about 60 weight percent of the hydrolyzed reaction product of trimellitic anhydride and ethylene glycol in a mole ratio of from about 2.0:0.6 to about 2.0:1.5.

11. The cellulose crosslinking composition of claim 9 wherein the mole ratio of trimellitic anhydride to ethylene glycol is from about 2.0:0.9 to about 2.0:1.1.

12. The cellulose crosslinking composition of claim 9 wherein the mole ratio of trimellitic anhydride to ethylene glycol is 2:1.

13. The cellulose crosslinking composition of claim 6 further containing an amount of base sufficient to adjust the pH to a value of at least about 2.0.

14. The cellulose crosslinking composition of claim 13 wherein said base is selected from the group consisting of ammonium hydroxide and alkali metal hydroxides.

15. The cellulose crosslinking composition of claim 8 further containing an amount of base sufficient to adjust the pH to a value of at least about 2.0.

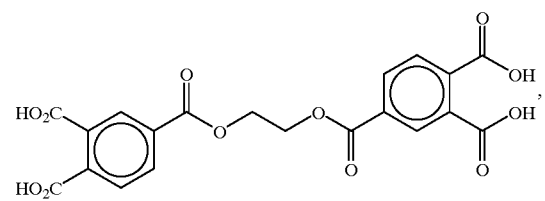

or a salt thereof and at least one compound selected from

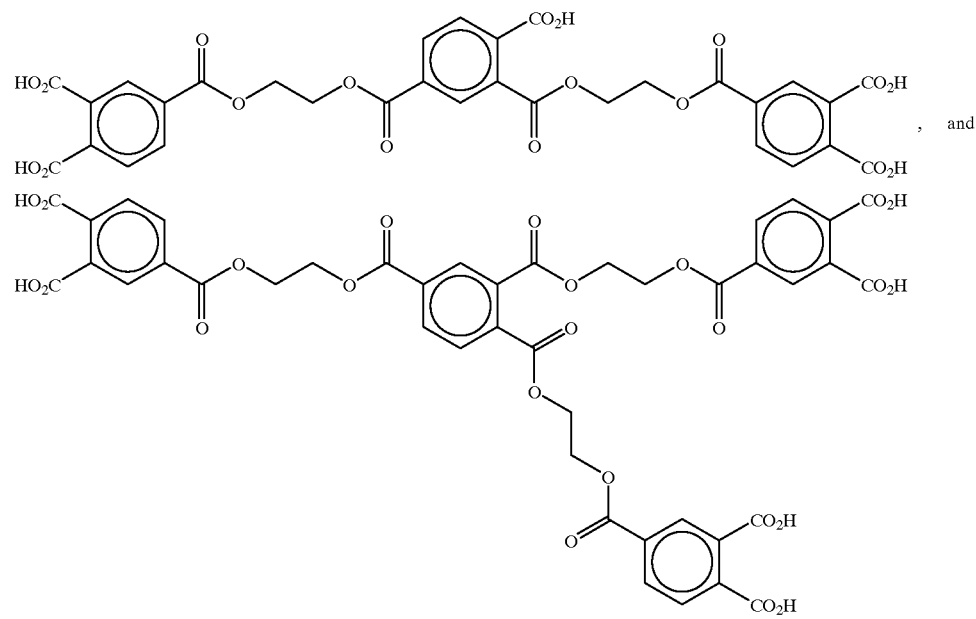

16. The cellulose crosslinking composition of claim 15 wherein said base is selected from the group consisting of ammonium hydroxide and alkali metal hydroxides.

17. The cellulose crosslinking composition of claim 6 wherein said diol is selected from 2-methyl-1,3-propanediol, diethylene glycol, and neopentyl glycol and wherein the reaction product is hydrolyzed in the presence of a water soluble basic hydroxide selected from the group consisting of ammonium hydroxide and an alkali metal hydroxide.

18. A cellulose crosslinking composition comprising an aqueous solution containing an effective crosslinking amount of a compound of the formula or a salt thereof.

19. The cellulose crosslinking composition of claim 18 comprising an aqueous solution containing a effective crosslinking amount of a compound of the formula

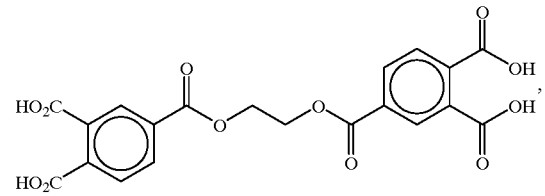

or a salt thereof and additionally containing compounds of the formulae

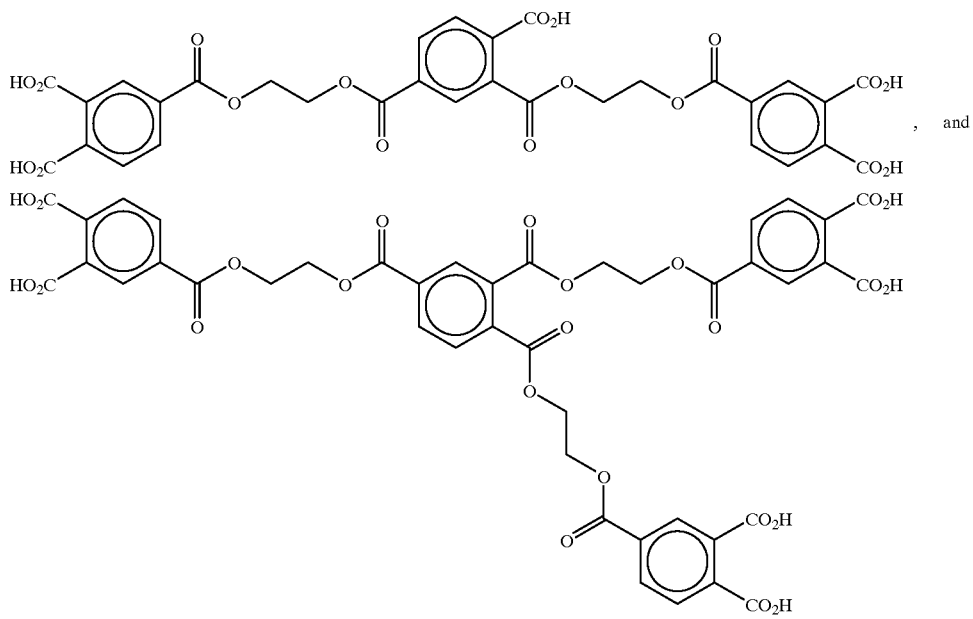

or salts thereof.

20. A cellulose crosslinking composition comprising an aqueous solution of a cellulose crosslinking effective amount of a hydrolyzed reaction product of trimellitic anhydride and ethylene glycol in a mole ratio of from about 2.0:0.6 to about 2.0:1.5 wherein said hydrolyzed reaction product comprises a compound of the formula

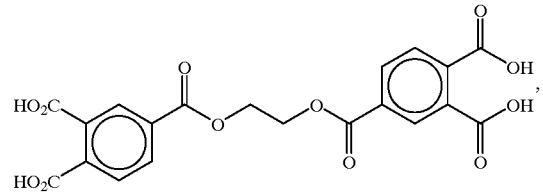

or a salt thereof and at least one compound selected from

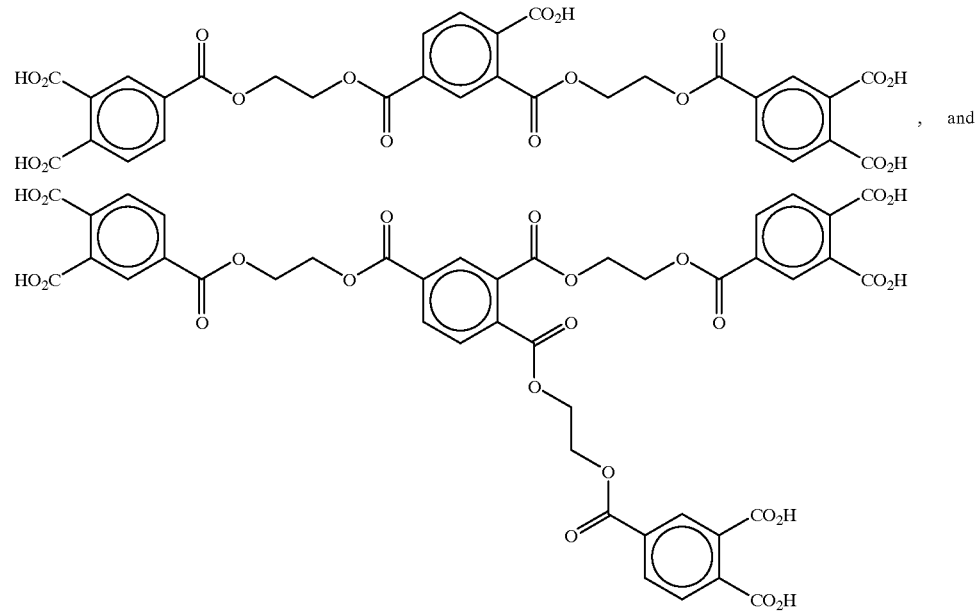

or a salt thereof.

21. A cellulose crosslinking composition according to claim 20 comprising an aqueous solution of a cellulose crosslinking effective amount of a hydrolyzed reaction product of trimellitic anhydride and ethylene glycol in a mole ratio of from about 2.0:0.6 to about 2.0:1.5 wherein said hydrolyzed reaction product comprises a mixture of compounds of the formula

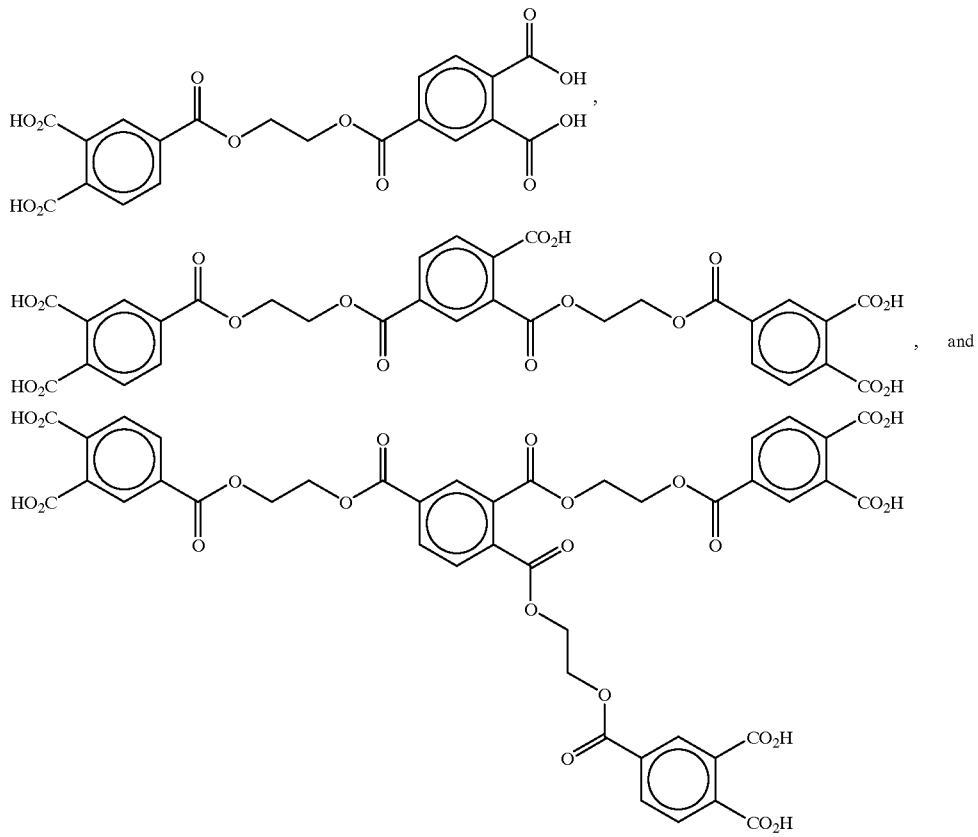

or salts thereof.

22. The solution of claim 20 further comprising an alkaline pH-modifying substance in an amount sufficient to adjust the pH to a value of at least about 2.0.

23. The solution of claim 21 further comprising an alkaline pH-modifying substance in an amount sufficient to adjust the pH to a value of at least about 2.0.

24. A cellulose crosslinking composition comprising an aqueous solution containing at least 0.5 weight percent of a hydrolyzed reaction product of trimellitic anhydride and at least one diol in a mole ratio of from about 2.0:0.6 to about 2.0:1.5, wherein said hydrolyzed reaction product comprises:

a) a polycarboxylic acid formed by hydrolysis of an alkyl glycol bis(anhydrotrimellitate) as a polyanhydride of the structure

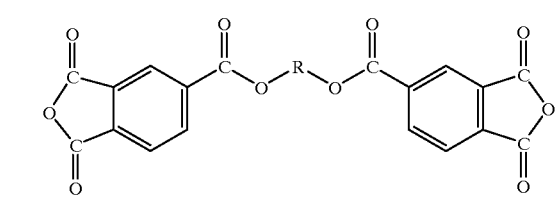

wherein R is selected from the group consisting of alkyl, alkylene and cycloalkylene moieties of up to 30 carbon atoms, ethylene oxide moieties of molecular weight up to about 6000, and propylene oxide moieties of molecular weight up to about 6000; and b) at least 10 weight percent of a mixture of two or more water-soluble oligomers represented by the formula $T_{n+1}D_n$, wherein T is that part of the oligomer molecule which is derived from trimellitic anhydride and D is that part of the oligomer molecule which is derived from a diol and wherein n is an integer of from about 2 to about 12.

25. The crosslinking composition of claim 24 wherein said diol is selected from ethylene glycol, propylene glycol, and 1,3-propanediol.

26. The crosslinking composition of claim 24 wherein said hydrolyzed reaction product comprises:

a) a polycarboxylic acid formed by hydrolysis of an alkyl glycol bis(anhydrotrimellitate)i as a polyanhydride of the structure

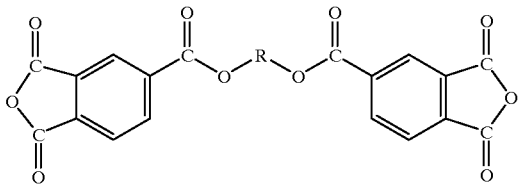

wherein R is an alkyl moiety of up to 30 carbon atoms; and b) at least 10 weight percent of a mixture of two or more water-soluble oligomers represented by the formula $T_{n+1}D_n$, wherein T is that part of the oligomer molecule which is derived from trimellitic anhydride and D is that part of the oligomer molecule which is derived from a diol and wherein n is an integer of from about 2 to about 12.

27. The crosslinking composition of claim 26 further containing at least one oligomer of the formula $T_mD_m$ wherein T is that part of the oligomer molecule which is derived from trimellitic anhydride and D is that part of the oligomer molecule which is derived from a diol and wherein m is at least 4.

28. A cellulose crosslinking composition according to claim 24 comprising an aqueous solution containing at least 0.5 weight percent of a hydrolyzed reaction product of trimellitic anhydride and ethylene glycol in a mole ratio of from about 2.0:0.6 to about 2.0:1.5, wherein said hydrolyzed reaction product comprises:

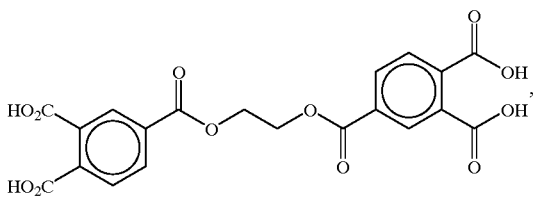

b) at least 10 weight percent of a mixture of two or more water-soluble oligomers represented by the formula $T_{n+1}E_n$, wherein T is that part of the oligomer molecule which is derived from trimellitic anhydride and E is that part of the oligomer molecule which is derived from ethylene glycol and wherein n is an integer of from about 2 to about 12.

29. The crosslinking composition of claim 28 further containing at least one oligomer of the formula $T_mE_m$ wherein T is that part of the oligomer molecule which is derived from trimellitic anhydride and E is that part of the oligomer molecule which is derived from ethylene glycol and wherein m is at least 4.

30. A cellulose crosslinking composition according to claim 1 which comprises an aqueous solution containing at least 0.5 weight percent of a hydrolyzed reaction product of trimellitic anhydride and at least one diol in a mole ratio of from about 2.0:0.6 to about 2.0:1.5 prepared by a process comprising:

(a) heating trimellitic anhydride to a melt;
(b) reacting the trimellitic anhydride melt with a diol in a mole ratio of from about 2.0:0.6 to about 2.0:1.5 to obtain a reaction product; and
(c) hydrolyzing the reaction product by adding the reaction product to water.

31. A cellulose crosslinking composition according to claim 30 which comprises an aqueous solution containing at least 0.5 weight percent of a hydrolyzed reaction product of trimellitic anhydride and ethylene glycol in a mole ratio of from about 2.0:0.6 to about 2.0:1.5 prepared by a process comprising:

(a) heating trimellitic anhydride to a melt;
(b) reacting the trimellitic anhydride melt with ethylene glycol in a mole ratio of from about 2.0:0.6 to about 2.0:1.5 to obtain a reaction product; and
(c) hydrolyzing the reaction product by adding the reaction product to water which is at a temperature of at least about 70° C.

32. The cellulose crosslinking composition of claim 31 wherein the mole ratio of trimellitic anhydride to ethylene glycol is about 2.0:0.9 to about 2.0:1.1.

33. The cellulose crosslinking composition of claim 31 wherein the mole ratio of trimellitic anhydride to ethylene glycol is about 2.0:1.0.

34. A cellulose crosslinking composition according to claim 30 prepared by a process comprising:

(a) heating trimellitic anhydride to a melt;
(b) reacting the trimellitic anhydride melt with a diol in a mole ratio of from about 2.0:0.6 to about 2.0:1.5 to obtain a reaction product; and
(c) hydrolyzing the reaction product by adding the reaction product to water which is at a temperature of at least 70° C. in the presence of a water soluble basic hydroxide.

35. A cellulose crosslinking composition according to claim 28 comprising an aqueous solution containing at least 0.5 weight percent of a hydrolyzed reaction product of trimellitic anhydride and ethylene glycol in a mole ratio of from about 2.0:0.6 to about 2.0:1.5, wherein said hydrolyzed reaction product comprises:

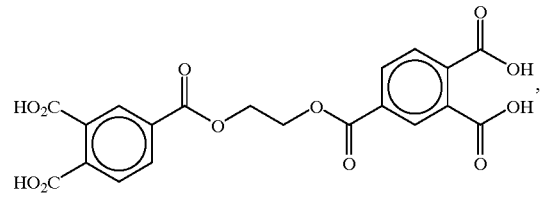

b) at least 10 weight percent of a mixture of two or more water-soluble oligomers represented by the formula $T_{n+1}E_n$, wherein T is that part of the oligomer molecule which is derived from trimellitic anhydride and E is that part of the oligomer molecule which is derived from ethylene glycol and wherein n is an integer of from about 2 to about 12; and c) an oligomer of the formula $T_4E_4$ wherein T is that part of the oligomer molecule which is derived from trimellitic anhydride and E is that part of the oligomer molecule which is derived from ethylene glycol.

36. A cellulose crosslinking composition according to claim 35 comprising an aqueous solution containing about 50 to about 60 weight percent of a hydrolyzed reaction product of trimellitic anhydride and ethylene glycol in a mole ratio of 2:1, wherein said hydrolyzed reaction product comprises:

a) about 12 to about 15 weight percent trimellitic acid, b) about 60 weight percent

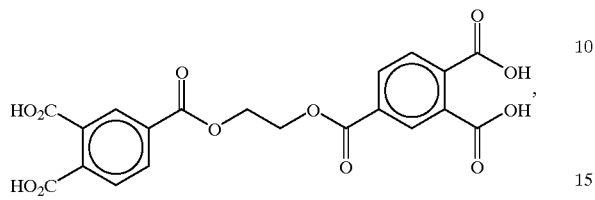

c) at least 10 weight percent of a mixture of two or more water-soluble oligomers represented by the formula $T_{n+1}E_n$, wherein T is that part of the oligomer molecule which is derived from trimellitic anhydride and E is that part of the oligomer molecule which is derived from ethylene glycol and wherein n is an integer of from about 2 to about 12 and an oligomer of the formula $T_4E_4$ wherein T is that part of the oligomer molecule which is derived from trimellitic anhydride and E is that part of the oligomer molecule which is derived from ethylene glycol.

* * * * *

UNITED STATES PATENT AND TRADEMARK OFFICE
CERTIFICATE OF CORRECTION

PATENT NO. : 5,981,739  
DATED : November 9, 1999  
INVENTOR(S) : Ronald L. Anderson, Wendell W. Cattron, Vincent F. Smith, Jr., David J. Fenoglio Page 1 of 3

It is certified that error appears in the above-identified patent and that said Letters Patent is hereby corrected as shown below:

Column 3,  
Line 45, "a diaper, may" should read: "a diaper may"

Column 4,  
Line 6, "a polyanhydride" should read: "a polyanhydride."

Column 10,  
Line 53, "1000 glmol," should read: "1000 g/mol,"

Column 12,  
Line 14, "solubility of (11)" should read: "solubility of (II)"  
Line 49, "composition $T_2E$," should read "compsition: $T_2E$,"  
Line 50, "$T_8E_7$," should read: "$T_8E_7$,"  
Line 50, "$T_{10}EG$," should read: $T_{10}E_9$,"  
Line 54, "less that the number" should read: "less than the number"

Column 14,  
Line 10, "Advantageously at least" should read: Advantageously, at least"

Column 15,  
Line 4, "if desired the pH" should read: "if desired, the pH"

UNITED STATES PATENT AND TRADEMARK OFFICE
CERTIFICATE OF CORRECTION

PATENT NO. : 5,981,739
DATED : November 9, 1999
INVENTOR(S) : Ronald L. Anderson, Wendell W. Cattron, Vincent F. Smith, Jr., David J. Fenoglio It is certified that error appears in the above-identified patent and that said Letters Patent is hereby corrected as shown below:

Column 20,
Line 18, "wet   50" should read: "wet   5.0"
Line 62, "benz Type TKFN-JR" should read: "Benz Type TKF/V-JR"

Column 21,
Line 4, "TM 66))," should read: "TM66),"
Line 5, "(MTCC TM" should read: "(AATC TM"

Column 23,
Line 10, "dry tensile (lg./in.)" should read: "dry tensile (lb./in.)"
Line 18, "according to Example I" should read: "according to Example 1"
Line 65, "solution" should read: "solution)"

Column 24,
Line 54, "AND ROM TMA" should read: "AND FROM TMA"

Column 25,
Line 25, "however the EGBAT" should read: "however, the EGBAT"

Column 26,
Line 38, "a white recipitate" should read: "a white precipitate"

UNITED STATES PATENT AND TRADEMARK OFFICE
CERTIFICATE OF CORRECTION

PATENT NO. : 5,981,739
DATED : November 9, 1999
INVENTOR(S) : Ronald L. Anderson, Wendell W. Cattron, Vincent F. Smith, Jr., David J. Fenoglio It is certified that error appears in the above-identified patent and that said Letters Patent is hereby corrected as shown below:

Column 35,
Line 4, "bis (anhydrotrimellitate) i as" should read: "bis (anhydrotrimellitate) as"
Lines 37-46, CHEMICAL STRUCTURE SHOULD BE PRECEDED BY "a)" AND SHOULD BE FOLLOWED BY "and"

Column 36,
Line 45, CHEMICAL STRUCTURE SHOULD BE PRECEDED BY "a)"

Signed and Sealed this

Twenty-first Day of August, 2001

Attest:

*Nicholas P. Godici*

NICHOLAS P. GODICI
*Attesting Officer*   *Acting Director of the United States Patent and Trademark Office*